US006938220B1

(12) United States Patent
Shigematsu et al.

(10) Patent No.: US 6,938,220 B1
(45) Date of Patent: Aug. 30, 2005

(54) INFORMATION PROCESSING APPARATUS

(75) Inventors: Hiroyuki Shigematsu, Yamatokoriyama (JP); Yutaka Nakamura, Soraku-gun (JP); Munenori Sakamoto, Yamatokoriyama (JP); Hiroyuki Nagasawa, Shiki-gun (JP); Hiroshi Nakao, Shiki-gun (JP); Yasuhiro Nakajima, Yao (JP); Masaaki Kurata, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/028,480

(22) Filed: Feb. 24, 1998

Related U.S. Application Data

(60) Continuation of application No. 08/457,458, filed on Jun. 1, 1995, which is a division of application No. 08/136,209, filed on Oct. 15, 1993, now Pat. No. 5,481,278.

(30) Foreign Application Priority Data

Oct. 21, 1992 (JP) .......................................... 4-283273
Oct. 21, 1992 (JP) .......................................... 4-283276

(51) Int. Cl.[7] .......................................... G09G 5/00
(52) U.S. Cl. ........................ 715/863; 715/864; 382/187
(58) Field of Search ................................ 345/358, 173, 345/174, 177, 178, 179; 715/863, 864, 865; 382/187, 188, 189

(56) References Cited

U.S. PATENT DOCUMENTS

| | | | | |
|---|---|---|---|---|
| 4,491,933 A | | 1/1985 | Ursin et al. | 707/527 |
| 4,656,662 A | | 4/1987 | Filliman et al. | 382/119 |
| 5,220,649 A | | 6/1993 | Forcier | 707/541 |
| 5,231,698 A | | 7/1993 | Forcier | 345/358 |
| 5,252,951 A | | 10/1993 | Tannenbaum et al. | 345/358 |
| 5,294,792 A | | 3/1994 | Lewis et al. | 345/163 |
| 5,347,295 A | * | 9/1994 | Agulnick et al. | 345/358 |
| 5,517,578 A | | 5/1996 | Altman et al. | 382/181 |
| 5,523,775 A | * | 6/1996 | Capps | 345/179 |
| 5,583,542 A | * | 12/1996 | Capps et al. | 345/179 |
| 5,602,570 A | | 2/1997 | Capps et al. | 345/173 |
| 5,625,833 A | | 4/1997 | Levine et al. | 345/507 |

FOREIGN PATENT DOCUMENTS

| | | |
|---|---|---|
| EP | 0243925 | 11/1987 |
| EP | 0 243 925 | 11/1987 |
| JP | 51-93830 | 8/1976 |
| JP | 62-28828 | 2/1987 |
| JP | 62-256023 | 7/1987 |
| JP | 63-303420 | 12/1988 |
| JP | 63-316226 | 12/1988 |
| JP | 64-38817 | 2/1989 |
| JP | 3-150625 | 6/1991 |
| JP | 5-61596 | 3/1993 |
| WO | WO 92/08183 | 5/1992 |

OTHER PUBLICATIONS

*Patent Abstracts of Japan,* vol. 11, No. 58 (P–550), Feb. 21, 1987 & JP–A–61 223 972 (Hit6achi Ltd), Oct. 4, 1986.

(Continued)

*Primary Examiner*—Ba Huynh
(74) *Attorney, Agent, or Firm*—Nixon & Vanderhye P.C.

(57) ABSTRACT

An information processing apparatus obtains a distance that an input pen is moved in terms of the number of dots covered on a display screen, and from that number, judges whether a pen stroke is a gesture entry or a pointing entry. When the input pen is moved over more than a predetermined number of dots, e.g., eight dots, gesture recognition processing is performed. If the input pen is moved less than that number of dots, a pointing instruction is recognized, and pointing processing is performed. If a gesture is recognized, a recognized gesture editing command and a feature point of the gesture command are stored in RAM. Since an input by the input pen is judged a gesture entry or a pointing entry according to the number of dots over which the input pen is moved, a switch is not required to change data/instruction entry modes which reduces cost and improves handling.

2 Claims, 24 Drawing Sheets

OTHER PUBLICATIONS

*Patent Abstracts of Japan,* vol. 16, No. 442 (P–1421), Sep. 16, 1992 & JP–A–04 153 725 (Sharp Corp), May 27, 1992.

*IBM Technical Disclosure Bulletin,* vol. 34, No. 7A, Dec. 1991, New York, pp. 20–25, XP255448, "Pause Preview: A Technique for Improving the Interactivity of Direct Manipulation".

*Pattern Recognition,* vol. 24, No. 9, 1991, Elmsford, NY, U.S. pp. 895–907, XP230139, Lipscomb, "A Trainable Gesture Recogniser".

"Buttons as First Class Objects on an X Desktop", Robertson et al., Nov. 11, 1991, XP 000315064, pp. 35–44 ACM Symposium on User Interface Software and Technology, US, New York, NY.

* cited by examiner

| REFERENCE STROKE | COMMAND | REFERENCE STROKE | COMMAND |
|---|---|---|---|
|  | DELETE ONE CHARACTER |  | DELETE PART OF DOCUMENT (AFTER SPECIFYING THE BLOCK) |
|  | UNDERLINE |  | COPY (TO) |
|  | SPACE (ONE CHARCTER) |  | MOVE (TO) |
|  | SPACE (MORE THAN ONE CHARCTER) |  | PAGE UP |
|  | CARRIER RETURN |  | PAGE DOWN |
|  | CENTER |  | HANDWRITTEN ENTRY |
|  | ALIGN RIGHT |  | RESTORE DELETE |

| REFERENCE STROKE | FUNCTION |
|---|---|
|  | CARRIER RETURN |
|  | INSERTING SPACE |
|  | DELETING ONE CHARACTER |
|  | TAB |
|  | SPECIFYING A BLOCK TO BE EDITED |

| COMMAND | STATUS OF GESTURE COMMANDS | |
|---|---|---|
| DELETE ONE CHARACTER | ○ EFFECTIVE | ● INEFFECTIVE |
| SCROLL | ● EFFECTIVE | ○ INEFFECTIVE |
| ⋮ | ⋮ | ⋮ |

| GESTURE PROCESSING | |
|---|---|
| MODE | ●EFFECTIVE ○PARTLY EFFECTIVE ○INEFFECTIVE |

INFORMATION PROCESSING APPARATUS

This application is a continuation of U.S. Ser. No. 08/457,458, filed Jun. 1, 1995, which in turn is a division of U.S. Ser. No. 08/136,209, filed Oct. 15, 1993, now U.S. Pat. No. 5,481,278.

FIELD OF THE INVENTION

The present invention relates to an information processing apparatus capable of editing a document displayed an a screen by handwriting using a pen.

BACKGROUND OF THE INVENTION

A conventional information processing apparatus, such as a word processor and a computer, often employs keyboard entry. In such an information processing apparatus, when editing a document, for example, a character or a block of text to be edited is specified by moving a cursor using the keyboard, and a desired editing operation is executed using edit keys.

In recent years, an apparatus, which enables data entry by directly pointing a screen provided with a tablet by means of a pen for inputting coordinates, has been developed. There is an apparatus of this type having a gesture function to edit a document by handwriting. With this apparatus, when a line as an edit symbol is drawn on the screen with a pen, an editing operation specified by a command corresponding to the pattern of the line is performed.

Such an information processing apparatus generally does not use a cursor, or switches between cursor movements and gesture entry using a pen provided with a switch.

However, with conventional word processors, generally, cursors are used when executing operations. Therefore, if there is no cursor, i.e., pointing means, a drawback occurs in terms of handling. Moreover, it is not desirable to provide a switch on the pen as it causes an increase in the cost and requires troublesome switching operations.

Moreover, a conventional editing operation using a gesture has the following drawbacks.

First drawback is that a great deal of effort is required to learn editing techniques. More specifically, a method of specifying characters to be edited varies depending on commands. Therefore, the user needs to learn the pattern of a line representing each command and a specifying method corresponding to each command. In the case of a command to delete one character by drawing a mountain-like line, for example if the peak of the mountain shape is arranged to be a reference location for editing, the mountain peak of the line is needed to drawn over the character to be edited.

The second drawback is an inefficient editing process. In conventional gesture entry, putting down a pen on a screen to draw a line and lifting up the pen from the screen after drawing are treated as a single process. Consequently, the effectiveners of an input by pen is determined after the pen is lifted resulting in longer processing time.

In this case, if the input pen is moved into an area where gesture entry is unavailable, the gesture processing stops and an error message is given. Therefore, care needs to be taken throughout the input operation, i.e., from the start of drawing to the end of drawing, requiring rather complicated handling.

In order to effectively use the conventional gesture entry function, the trace of the input pen and a list of edit commands are displayed. However, the processing time is increased because the display of the trace of the input pen and the list of commands is caused to appear and disappear repeatedly.

The third drawback is that edit processing becomes ineffective in the area of the screen where editing by gesture entry is unavailable. For example, when the input pen is moved into the area, particularly into an input area having icons, the input made in the input area is taken first and therefore the input made to execute the gesture entry is cancelled. In this case, drawing must be started again by moving the input pen not to pass through the area.

The fourth drawback is that mistaken handling likely causes editing errors. For example, if an edit symbol for deletion is mistakenly entered, a character or text is unnecessarily deleted. And, an extra time is required to restore the mistakenly deleted character or text.

SUMMARY OF THE INVENTION

An object of the present invention is to provide an information processing apparatus having an improved gesture function.

In order to achieve the above object, an information processing apparatus of the present invention includes:

- a screen;
- an input pen for inputting coordinates and drawing a line on the screen;
- position detecting means for detecting coordinates of a position on the screen where a pen point of the input pen makes contact with the screen;
- reference-stroke storing means for storing a plurality of predetermined reference strokes;
- reference-stroke selecting means for comparing a pen stroke made on a text on the screen by the input pen with the reference strokes according to coordinates detected by the position detecting means and selecting a reference stroke which is closest to the pen stroke;
- processing means for editing the text according to an edit instruction corresponding to the reference stroke selected by the reference-stroke selecting means and inputting coordinates of a position on the screen pointed by the input pen;
- first distance judging means for judging whether a distance the input pen is moved on the screen exceeds a predetermined distance; and
- first processing selecting means for selecting a processing to be executed by the processing means by judging a pen movement which is shorter than the predetermined distance as coordinates input while judging a pen movement which is longer than the predetermined distance as a pen stroke.

In the information processing apparatus, whether a movement of the input pen exceeds a predetermined distance or not is judged by the first distance judging means. The distance the input pen was moved is given by the number of dots. As for the predetermined distance used as a reference for judgement, although a few dots are enough for indicating a movement of a cursor, it is desirable to determine the number of dots for the predetermined distance used as a reference for judgement by considering an unintentional movement of the pen point.

Next, processing to be performed by the processing means is selected by the first processing selecting means. At this time, if a pen movement is judged to be shorter than the predetermined distance, the pen movement is judged as coordinates input, and coordinate inputting processing is selected. On the other hand, if the pen movement is judged to be longer than the predetermined distance, the pen movement is judged as a pen stroke and edit processing is selected. When the coordinate inputting processing is selected, the coordinate inputting processing including moving the cursor is executed by the processing means according to an input position of the input pen.

When the edit processing is selected, the pen stroke made on the text on the screen using the input pen is compared with the reference strokes stored in the reference-stroke storing means, according to the coordinates detected by the position detecting means. When a reference stroke closest to the pen stroke is selected by the comparison, edit processing is executed by the processing means in accordance with an edit instruction corresponding to the selected reference stroke.

With the information processing apparatus, since the coordinates input and edit processing are distinguished and executed according the distance of a pen movement, there is no need to provide a switch on the input pen for switching between coordinates input and edit processing.

In order to achieve the above object, another information processing apparatus of the present invention includes:

- a screen;
- an input pen for inputting coordinates and drawing a line on said screen;
- position detecting means for detecting coordinates of a position on said screen where a pen point of said input pen makes contact with said screen;
- reference-stroke storing means for storing a plurality of predetermined reference strokes;
- reference-stroke selecting means for comparing a pen stroke made on a text on the screen by the input pen with the reference strokes according to coordinates detected by the position detecting means and selecting a reference stroke which is closest to the pen stroke;
- processing means for editing the text according to an edit instruction corresponding to the reference stroke selected by the reference-stroke selecting means and inputting coordinates of a position on the screen pointed by the input pen;
- character checking means for judging whether a character on which said input pen is put down is a half-size letter or not;
- second distance judging means for judging whether a distance said input pen is moved on said screen exceeds a predetermined distance which varies depending on whether the character is a half-size letter or not; and
- second processing selecting means for selecting a processing to be executed by said processing means by judging a pen movement which is shorter than the predetermined distance as coordinates input while judging a pen movement which is longer than the predetermined distance as a pen stroke.

When an input starting point is given by bringing the input pen into contact with the screen, whether a character on the input starting point is a half-size letter or not is judged as the character checking means. If the character is a half-size letter, whether a pen movement exceeds a predetermined distance, for example, a half the distance used as a reference by the first distance judging means or not is judged by the second distance judging means. If the character is not a half-size letter, whether the pen movement exceeds a predetermined distance, for example, a distance used as a reference by the first distance judging means or not is judged.

When the edit processing is selected, the pen stroke made on the text on the screen using the input pen is compared with the reference strokes stored in the reference-stroke storing means, according to the coordinates detected by the position detecting means. When a reference stroke closest to the pen stroke is selected by the comparison, edit processing is executed in accordance with an edit instruction corresponding to the selected reference stroke by the processing means.

Then, processing to be performed by the processing means is selected by the second processing selecting means according to a judgement made by the second distance judging means. When the coordinate inputting processing is selected, coordinate input processing including moving the cursor is performed by the processing means according to the input position of the input pen. When the edit processing is selected, edit processing is executed by the processing means in accordance with an edit instruction corresponding to the reference stroke selected by the reference-stroke selecting means.

Like the above-mentioned apparatus, with the information processing apparatus, since the coordinates input and edit processing are distinguished and executed according the distance of a pen movement, there is no need to provide a switch on the input pen for switching between coordinates input and edit processing. Moreover, with the information processing apparatus, a distance used as a reference for switching the processing is varied depending on whether a character to be edited is a half-size letter or not. Therefore, even when a character to be edited is a small-size character such as a half-size letter, it is possible to switch processing between coordinates input and edit processing.

In order to achieve the above object, still another information processing apparatus of the present invention includes:

- a screen;
- an input pen for inputting coordinates and drawing a line on said screen;
- position detecting means for detecting coordinates of a position on said screen where a pen point of said input pen makes contact with said screen;
- reference-stroke storing means for storing a plurality of predetermined reference strokes;
- reference-stroke selecting means for comparing a pen stroke made on a text on the screen by the input pen with the reference strokes according to coordinates detected by the position detecting means and selecting a reference stroke which is closest to the pen stroke;
- processing means for editing the text according to an edit instruction corresponding to the reference stroke selected by the reference-stroke selecting means and inputting coordinates of a position on the screen pointed by the input pen; and
- input judging means for judging whether inputting a pen stroke is available or not according to pen-down coordinates prior to the edit processing, the pen-down coordinates representing a position on said screen where said input pen first made contact with said screen.

With the information processing apparatus, for example, if the position detecting means has an effective area where inputting a pen stroke is available and an ineffective area where inputting a pen stroke is unavailable, the input judging means makes a pen stroke effective when pen-down coordinates are located in the effective area and a pen stroke ineffective when the pen-down coordinates are located in the ineffective area.

Therefore, whether edit processing is available or not is determined at the time the pen-down coordinates are input, allowing the process to smoothly proceed to the edit processing.

In order to achieve the above object, another information processing apparatus of the present invention includes:

a screen;

an input pen for inputting coordinates and drawing a line on said screen;

position detecting means for detecting coordinates of a position on said screen where a pen point of said input pen makes contact with said screen;

reference-stroke storing means for storing a plurality of predetermined reference strokes;

reference-stroke selecting means for comparing a pen stroke made on a text on the screen by the input pen with the reference strokes according to coordinates detected by the position detecting means and selecting a reference stroke which is closest to the pen stroke;

processing means for editing the text according to an edit instruction corresponding to the reference stroke selected by the reference-stroke selecting means and inputting coordinates of a position on the screen pointed by the input pen; and status selecting means for selecting a status of each reference stroke in recognition processing of a pen stroke from effective and ineffective.

With the information processing apparatus, for example, if the status of a reference stroke corresponding to an edit command for deletion is set ineffective by the status selecting means, a pen stroke is not compared with the reference stroke. With this arrangement, even when a pen stroke resembling the reference stroke is input, the possibility of mistakenly performing a deletion of a character is eliminated.

It is thus possible to prevent the information processing apparatus from performing wrong operations due to a recognition of an unnecessary gesture command.

In order to achieve the above object, still another information processing apparatus of the present invention includes:

a screen;

an input pen for inputting coordinates and drawing a line on said screen;

position detecting means for detecting coordinates of a position on said screen where a pen point of said input pen makes contact with said screen;

reference-stroke storing means for storing a plurality of predetermined reference strokes;

reference-stroke selecting means for comparing a pen stroke made on a text on the screen by the input pen with the reference strokes according to coordinates detected by the position detecting means and selecting a reference stroke which is closest to the pen stroke;

processing means for editing the text according to an edit instruction corresponding to the reference stroke selected by the reference-stroke selecting means and inputting coordinates of a position on the screen pointed by the input pen; and storing means for temporarily storing information displayed on said screen.

With the information processing apparatus, since the document is temporarily stored by the storing means, even when data such as a list of edit commands is displayed on the screen, the document displayed on the screen is never been lost. For example, if information displayed on the screen before performing recognition processing is stored in the storing means, it is possible to perform edit processing on the information according to the result of the recognition processing by reading out the information from the storing means and displaying the information on the screen after the recognition processing is complete.

For a fuller understanding of the nature and advantages of the invention, reference should be made to the ensuing detailed description taken in conjunction with the accompanying drawings.

BRIEF DESCRIPTION OF THE DRAWINGS

FIG. 9(*b*) is an explanatory view illustrating matrix coordinates on the screen of the display device according to the basic structure of FIG. 8.

DESCRIPTION OF THE PREFERRED EMBODIMENTS

The following description discusses a first embodiment of the present invention with reference to FIGS. 1 to 14.

Figure 6:
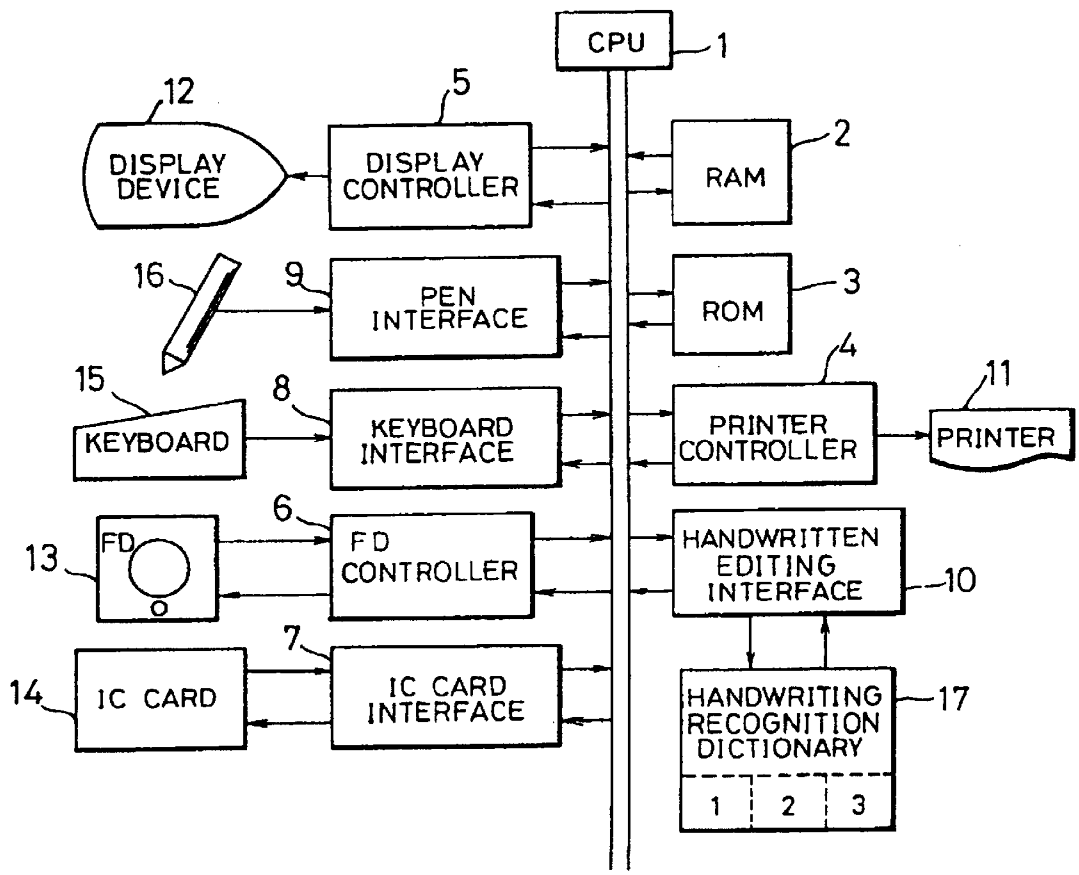
FIG. 6 is a block diagram illustrating a schematic structure of essential sections of the information processing apparatuses of the first and second embodiments of the present invention.

As illustrated in FIG. 6. an information processing apparatus of this embodiment has a control section constituted by a CPU (central processing unit) 1, ROM (read only memory) 2, RAM (random access memory) 3, a printer controller 4, a display controller 5, an FD (floppy disk) controller 6, an IC card interface 7, a keyboard interface 8, a pen interface 9, and a handwritten editing interface 10. Moving a cursor, entering characters and editing are executed using a key board 15 connected to the keyboard interface 8. It is also possible to perform these operations using an input pen 16 connected to the pen interface 9.

The CPU 1 is connected to the above-mentioned sections with a main bus, and functions as a central control section to control the operations of the information processing apparatus. Moving the cursor, entering characters and editing are executed by input operations using the keyboard 15 and the input pen 16.

In addition to the above-mentioned basic functions, the CPU 1 performs the following functions (A) to (D) so as to separately process pointing or coordinate entry and gesture entry.

(A) Calculating the Distance the Input Pen was Moved

The CPU 1 judges whether or not a distance (given by the number of dots) that the input pen 16 is moved on the screen 31 of the display device 12 exceeds a predetermined number of dots from pen data (to be described later) extracted by the input pen 16. For example, if the pen moves over less than nine dots, a pointing instruction is recognized and pointing processing is performed. On the other hand, if the pen moves over more than eight dots, an editing instruction, i.e., a gesture command is recognized, and the pen data obtained by the pen movement is sent to the handwritten editing interface 10 to execute gesture processing. In short, the CPU 1 serves as first distance judging means and processing means.

(B) Evaluating the Number of Dots Corresponding to the Attributes of a Character It is also possible to design the CPU 1 to change the number of dots used as reference in the evaluation, depending on the attributes of a character. For example, whether a character to be edited is a half-size letter or not is judged. When the character to be edited is judged as a half-size letter, if the input pen 16 moves over less than five dots, the pen movement is recognized as a pointing instruction and a pointing operation is executed. If the input pen 16 moves over more than four dots, the pen movement is recognized as a gesture command and gesture processing is executed. Thus, the CPU 1 also functions as character checking means and distance judging means.

(C) Controlling the Display of a Cursor

The CPU 1 causes the cursor to disappear from the display device 12 when performing gesture entry. Then, when a gesture command is recognized and confirmed by the handwritten editing interface 10, the CPU 1 causes the cursor to appear again on the display device 12. Namely, the CPU 1 functions as cursor control means.

(D) Controlling Drawing

When the input pen 16 moves over less than nine dots or five dots, a line (pen stroke) is not displayed on the screen 31 of the display device 12. Meanwhile, when the input pen 16 moves over more than eight dots or four dots, a line is coincidentally displayed on the screen. The CPU 1 functions as drawing control means.

The RAM 2 is a memory into which data can be written and from which data can be read out at any time, and functions to temporarily store the input data and the results of the arithmetic operations of the CPU 1. As to be described later, the RAM 2 has a plurality of work areas. The ROM 3 is a read only memory for storing programs and data necessary for the operations of the information processing apparatus.

The printer controller 4 is connected to the printer 11 and controls the printing operation of the printer 11 according to instructions from the CPU 1. The display controller 5 converts the display data from the CPU 1 into a video signal, transmits it to the display device 12, and controls the display operation of the display device 12 according to instructions from the CPU 1. The display device 12 includes a screen 31 and a tablet 32 to be described later (see FIG. 8).

The FD controller 6 communicates with the CPU 1 and controls a floppy disk device 13. The IC card interface 7 is provided with a slot into which an IC card 14 is to be inserted. The IC card interface 7 interconnects a CPU and a memory in the IC card 14 with the CPU 1.

The keyboard interface 8 is connected to the keyboard 15 and fetches key-input data entered using the keyboard 15. The pen interface 9 is connected to the input pen 16 such as a stylus, and fetches pen-input data produced using the input pen 16 and the tablet 32, to be described later.

The handwritten editing interface 10 is connected to the handwriting recognition dictionary 17, reads out gesture commands stored in the dictionary 17, and recognizes and specifies a gesture command corresponding to the pattern of a line drawn with the input pen 16 according to the pen-input data fetched by the pen interface 9.

The handwriting recognition dictionary 17 has three tables: (1) a horizontally-written gesture command table; (2)

a handwritten character table; and (3) a vertically-written gesture command table. Basic strokes of characters and symbols are classified and stored in the corresponding table.

Figure 7:
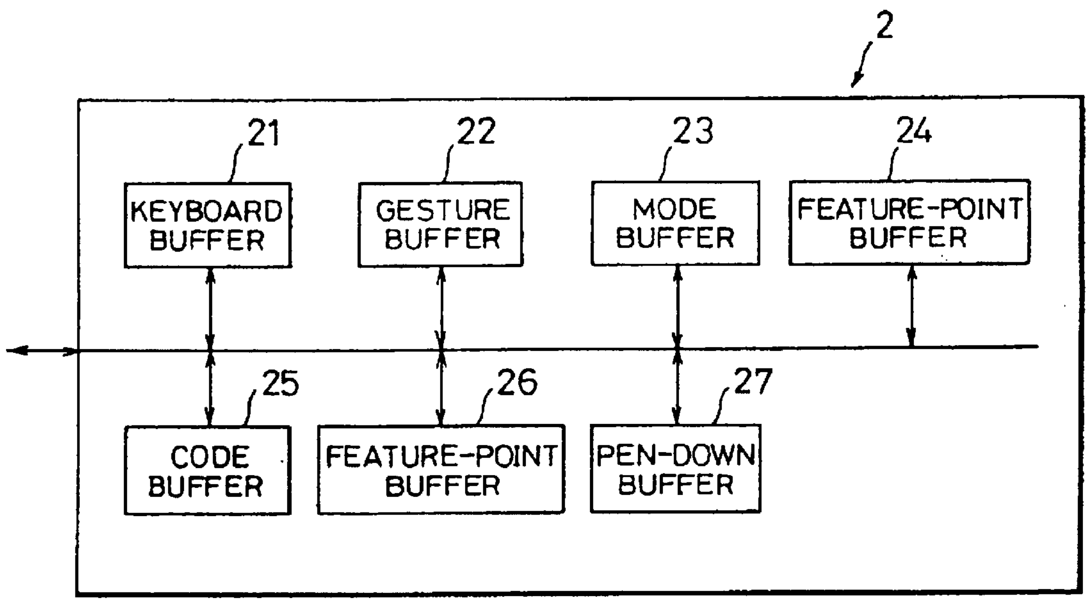
FIG. 7 is a block diagram illustrating work areas in RAM in the information processing apparatuses of FIG. 6.

As illustrated in FIG. 7, the RAM 2 has work areas including a keyboard buffer 21, a gesture buffer 22, a mode buffer 23, a feature-point buffer 24, a code buffer 25, a feature-point-number buffer 26, and a pen-down buffer 27.

The keyboard buffer 21 stores the key-input data and the pen-input data. The key-input data is produced by pressing a key, and indicates the key pressed. The pen-input data is produced by a movement of the input pen 16. The pen-input data includes pen-down data representing a moment at which the pen point of the input pen 16 touches the screen 31 of the display device 12, pen-up data representing a moment at which the input pen 16 comes out of contact with the screen 31, and pen-drag data representing the state in which the input pen 16 is moved in contact with the screen 31. The pen-input data includes the pen coordinates indicating the present location of the input pen 16 in contact with the screen 31.

The gesture buffer 22 temporarily stores the pen-input data from the pen interface 9 so as to transfer the pen-input data to the handwritten editing interface 10.

The mode buffer 23 stores the following four gesture modes indicating the state of the input pen 16 during the gesture processing. The gesture modes are set by the CPU 1.

G-PENDOWN . . . the input pen 16 is put down on the screen 31.

G-PENDRAG8IKA . . . the distance the input pen 16 is moved while being put down, i.e., the length of a line drawn with the input pen 16 is less than nine dots (or less than five dots when a specified character is a half-size letter).

G-PENDRAG9IZYOU . . . the length of a line drawn with the input pen 16 is more than eight dots (or more than four dots when the specified character is a half-size letter).

G-PENUP . . . the input pen 16 is lifted up from the screen 31.

The feature-point buffer 24 is a buffer for storing a set of x and y coordinates of a feature point which is used as a reference during gesture processing, and has a plurality of areas. Each area stores a single set of a feature point coordinates. The feature point coordinates are reference coordinates specifying a character to be edited. For example, when only one character is to be edited, the number of the feature point is one. When a plurality of characters are to be edited, the number of the feature points are more than two. In this information processing apparatus, the coordinates of a feature point which is first input when inputting a gesture command are considered as pen-down coordinates.

The code buffer 25 stores a gesture command corresponding to pen data extracted by the handwritten editing interface 10. The feature-point-number buffer 26 stores the number of the coordinates of the feature points stored in the feature-point buffer 24. The pen-down buffer 27 stores the pen-down coordinates.

Figure 8:
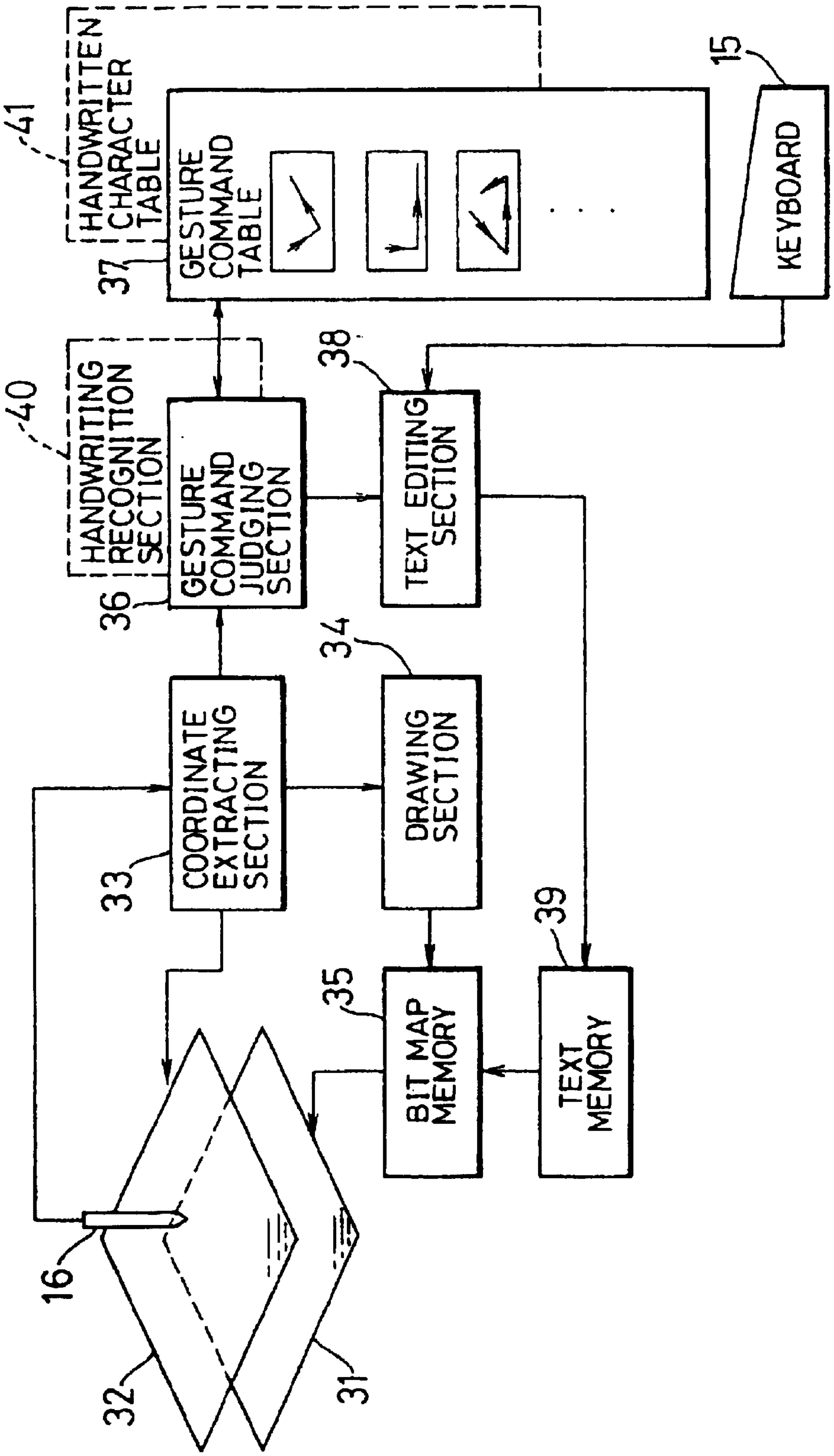
FIG. 8 is a block diagram illustrating a structure of an pen operation system to execute gesture processing in the information processing apparatuses of FIG. 6.

Next, the following description discusses a pen operation system to accomplish gesture entry and handwritten entry with reference to FIG. 8.

The basic structure includes the input pen 16, the display screen 31, the tablet 32, a coordinate extracting section 33, a drawing section 34, a bit map memory 35, a gesture command judging section 36, the gesture command table 37, a text editing section 38, a text memory 39, a handwriting recognition section 40 and a handwritten character table 41.

Figure 9A:
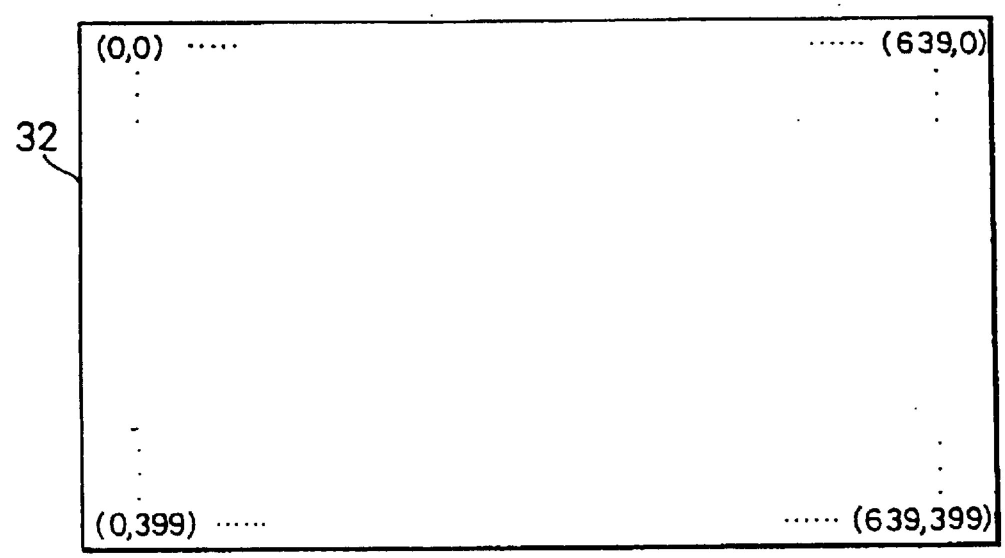
FIG. 9(*a*) is an explanatory view illustrating X and Y coordinates on a screen of a display device according to the basic structure of FIG. 8.
Figure 9B:
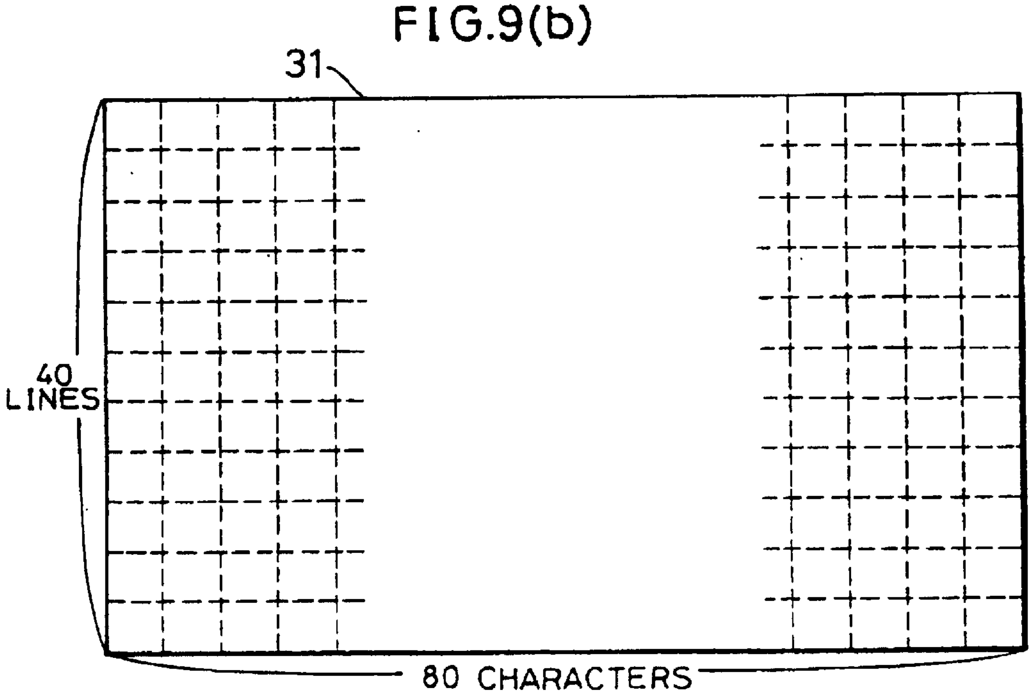

For example, the screen 31 displays 40 characters in a line, and 80 lines of characters as illustrated in FIG. 9(*b*). The transparent tablet 32 as position detecting means is disposed over the screen 31. When the pen point of the input pen 16 touches the screen 31, the tablet 32 generates change in potential on the contact point to produce pen coordinates. The tablet 32 has X-Y (640×400) coordinates (matrix) so as to correspond to the array of characters on the screen 31 shown in FIG. 9(*a*).

When the input pen 16 draws a line in contact with the tablet 32, the coordinates of every dot forming the line must be detected. For example, an electrostatic coupling tablet, an electrostriction tablet, a magnetostriction tablet, a high-pressure tablet, an ultrasonic tablet or an electromechanical tablet may be used.

The coordinate extracting section 33 is included in the pen interface 9, and consecutively extracts the coordinate data (data of the pen coordinates) from the tablet 32.

Like the text editing section 38, the drawing section 34 is included in the CPU 1 and produces a line image by connecting the pen coordinates extracted by the coordinate extracting section 33. The line image is sent to the bit map memory 35 in the RAM 2 (not shown in FIG. 7), combined with an image displayed on the screen 31, and sent to the screen 31.

The gesture command judging section 36 is included in the handwritten editing interface 10, compares the extracted coordinates data with reference stroke data of the gesture commands stored in the gesture command table 37, finds a gesture command corresponding to a reference stroke which is closest to the line produced by pen coordinates. After recognizing the command, the gesture command judging section 36 sends to the text editing section 38 the recognized gesture command, and the positional information of a character or a series of characters to be edited, recognized based on the coordinates data.

When the CPU 1 judges the pen movement as a pen stroke for entering a gesture, i.e., when the input pen 16 moves over more than eight dots, the gesture command judging section 36 performs the comparing operation. When a character to be edited is a half-size letter, if the CPU 1 judges the input pen 16 moves over more than four dots, the gesture command judging section 36 also performs the comparing operation. In addition to the gesture recognition function, the gesture command judging section 36 outputs the pen-down coordinates as one of the feature point coordinates, functioning as edit location specifying means.

Figure 10:
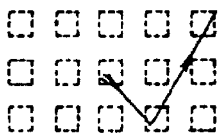
FIG. 10 is an explanatory view illustrating a combination of a reference stroke and a gesture command.
Figure 10:
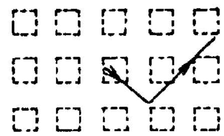
Figure 10:
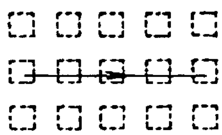
Figure 10:
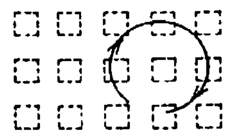
Figure 10:
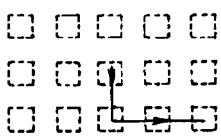
Figure 10:
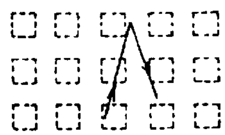
Figure 10:
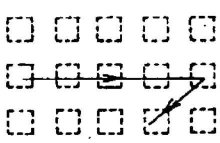
Figure 10:
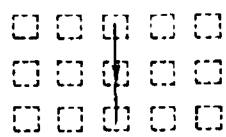
Figure 10:
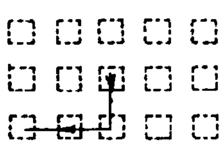
Figure 10:
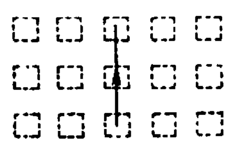
Figure 10:
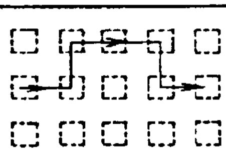
Figure 10:
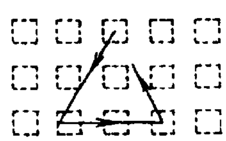
Figure 10:
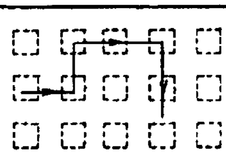
Figure 10:
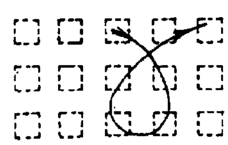

The gesture command table 37 stores the reference stroke data indicated by lines and the corresponding gesture commands, and is included in the handwriting recognition dictionary 17. For example, the commands shown in FIG. 10 are listed as gesture commands. The square boxes indicated by the broken lines in FIG. 10 indicate areas where characters are to be displayed.

More specifically, for example, the reference stroke of a gesture command to delete one character is a line resembling a V shape drawn from the left to the right. With this command, a character on a position given by the pen-down coordinates of the reference stroke is deleted. In the case of a gesture command to draw an underline, the reference stroke is a horizontal line drawn from the left to the right on a character or a series of character to be underlined.

Figure 11:
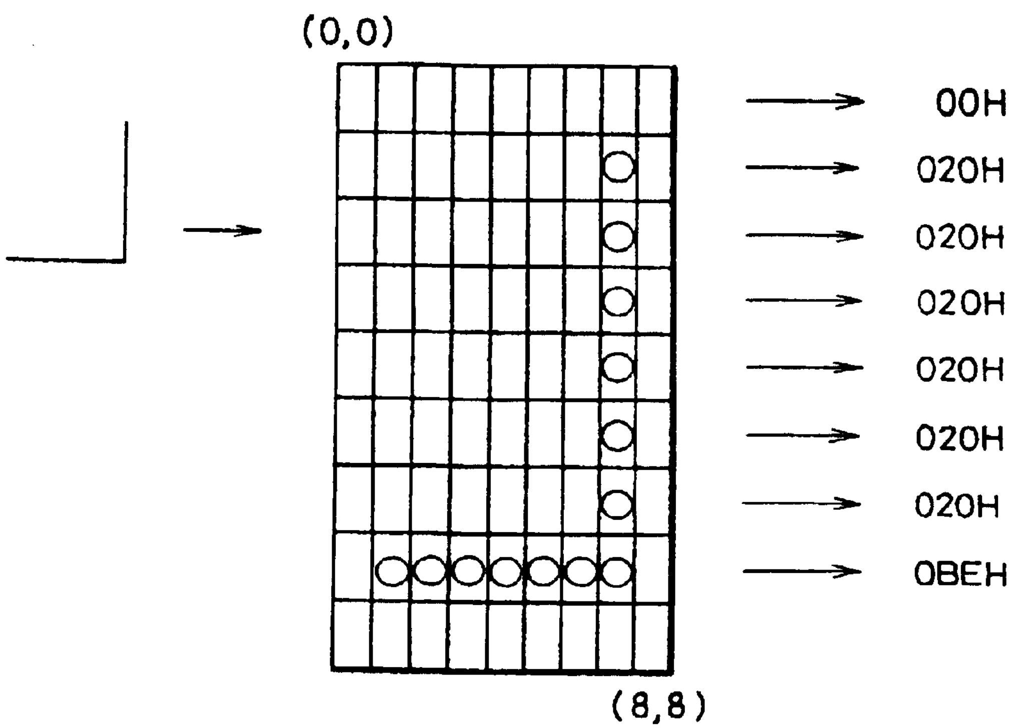
FIG. 11 is an explanatory view illustrating a table showing locations of dots in a reference stroke which is refereed to for recognizing a line.

Such a reference stroke is indicated by circles displayed in 9×9 boxes as shown in FIG. 11. The reference stroke in the shape of a reversed L indicates a carriage return. The reference stroke as an image of the edit symbol is freely resettable.

The text editing section 38 is included in the CPU 1 and edits a character or a series of characters in the text memory 39 corresponding to the positional information in accordance with a gesture command which has been recognized by the gesture command judging section 36. The positional information and the gesture command are supplied at the same time. The text editing section 38 receives not only the gesture command from the gesture command judging section 36 but also a command entered through the keyboard 15 so as to enable edit processing using keys.

The text memory 39 is a memory for storing a character or a series of characters displayed on the screen 31, and included in the RAM 2 like the bit map memory 35. The character data in the text memory 39 is combined with the image in the bit map memory 35 and displayed on the screen 31.

The handwriting recognition section 40 is disposed in a location equivalent to the location of the gesture command judging section 36 in terms of processing, i.e., located in the handwritten editing interface 10. The handwritten-character table 41 is included in the handwriting recognition dictionary 17 like the gesture command table 37.

The handwriting recognition section 40 compares the coordinates data extracted by the coordinate extracting section 33 with the basic character strokes in the handwritten-character table 41. When a character code corresponding to a basic character stroke closest to the line drawn based on the coordinates data is recognized, it is sent to the text editing section 38. Thus, the handwriting recognition section 40 performs processing in the same manner as the gesture command judging section 36 recognizes the gesture command based on the coordinates data. The difference between the handwriting recognition section 40 and the gesture command judging section 36 is that the handwriting recognition section 40 does not supply the positional information to the text editing section 38 since there is no need to specify an editing location when inputting characters.

The following description discuses one example of a gesture operation in the information processing apparatus.

Figure 12:
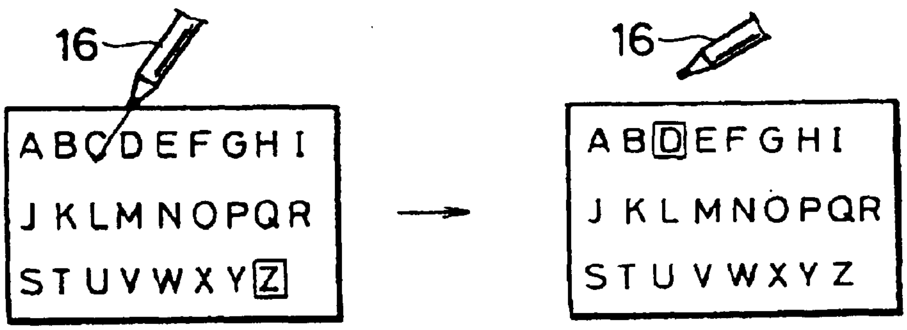
FIG. 12 is an explanatory view illustrating a specific example of gesture entry performed with the basic structure of FIG. 8.
Figure 13:
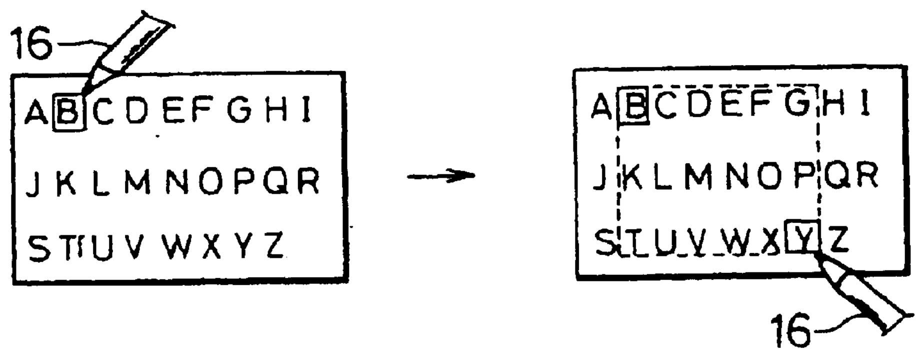
FIG. 13 is an explanatory view illustrating a specific example of pointing entry performed with the basic structure of FIG. 8.

For example, when deleting a letter "C" from the series of letters shown in FIG. 12, the input pen 16 is put down (a pen-down point as a reference point) on the letter "C" and a line in the shape of near V is drawn on the letter "C". Then, coordinates data is extracted by the coordinate extracting section 33. The image drawn by the drawing section 34 based on the coordinates data is combined with the image displayed on the screen 31 from the bit map memory 36. Therefore, the line drawn with the input pen 16 in the above-mentioned manner is simultaneously displayed on the screen 31.

Next, when the input pen 16 is moved away from the tablet 32, the gesture command judging section 36 compares the coordinates data and the gesture commands in the gesture command table 37, and obtains a gesture command to delete one character. The positional information of a character to be edited and the gesture command are then transmitted to the text editing section 38. In the processing by the text editing section 38, the cursor is moved to a position designated by the positional information, the letter "C" in the text memory 39 is deleted according to the gesture command, and the coordinate extracting section 33 goes into a standby state for the next gesture operation.

Next, a pointing operation in the information processing apparatus is discussed. When defining a block in the series of letters shown in FIG. 13, if the letters "B" and "Y" are pointed by the input pen 16 for example, a rectangular area having a diagonal line connecting the letters "B" and "Y" is specified. During the pointing, the coordinates data and the gesture command are not compared by the gesture command judging section 36, and only the positional information is output. The pointing operation and the gesture operation are separately performed by the process described later.

Figure 14:
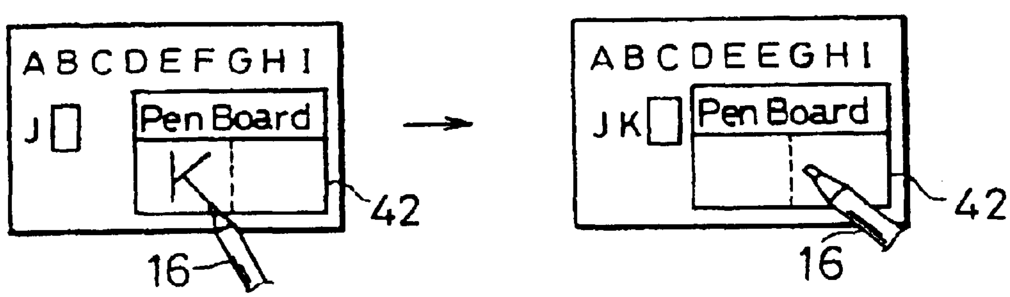
FIG. 14 is an explanatory view illustrating a specific example of handwritten entry performed with the basic structure of FIG. 8.

In the information processing apparatus, when entering a character, a pen board 42 appears on the screen 31 as illustrated in FIG. 14. The pen board 42 has an input space for two characters, and is given by the text editing section 38. For example, when a letter "K" is written in a first input area of the pen board 42, the coordinates data of "K" is extracted by the coordinate extracting section 33. Then, an image drawn by the drawing section 34 in accordance with the coordinates data is combined with the image displayed on the screen 31 by the bit map memory 36.

When the input pen 16 is moved to write a character in the above-mentioned manner, a character corresponding to the pen movement is displayed on the pen board 42 on the screen 31. Namely, on the screen 31, as the pen point of the input pen 16 moves, dots appear on the screen 31 as if to draw the character.

When the input pen 16 is moved away from the tablet 32, the coordinates data and the reference strokes in the handwritten-character table 41 are compared by the handwriting recognition section 40 to obtain the matching character code. When the character code is sent to the text editing section 38, the letter "K" is added to the text memory 39 through the processing performed by the text editing section 38.

As a result, a letter "K" is displayed in a regular type style next to a letter "J" located at one end of the series of letters on the screen 31 in the same manner as it entered using the keyboard 15. The letters are printable by the printer 11. Recognizing the character in the first input area is performed as the input-pen 16 is put down in the second input area of the pen board 42.

When a line in the shape of near Δ shown in FIG. 10 is drawn to input a gesture command to input characters by handwriting, the gesture entry is switched to the handwritten entry. In addition, if a specific type style is stored in the handwritten-character table 41, when a character is written on the pen board 42 by handwriting, the entered character is displayed or printed in the stored type style.

The following description discuses a procedure of separately executing the pointing operation and the gesture operation in the information processing apparatus.

Figure 2:
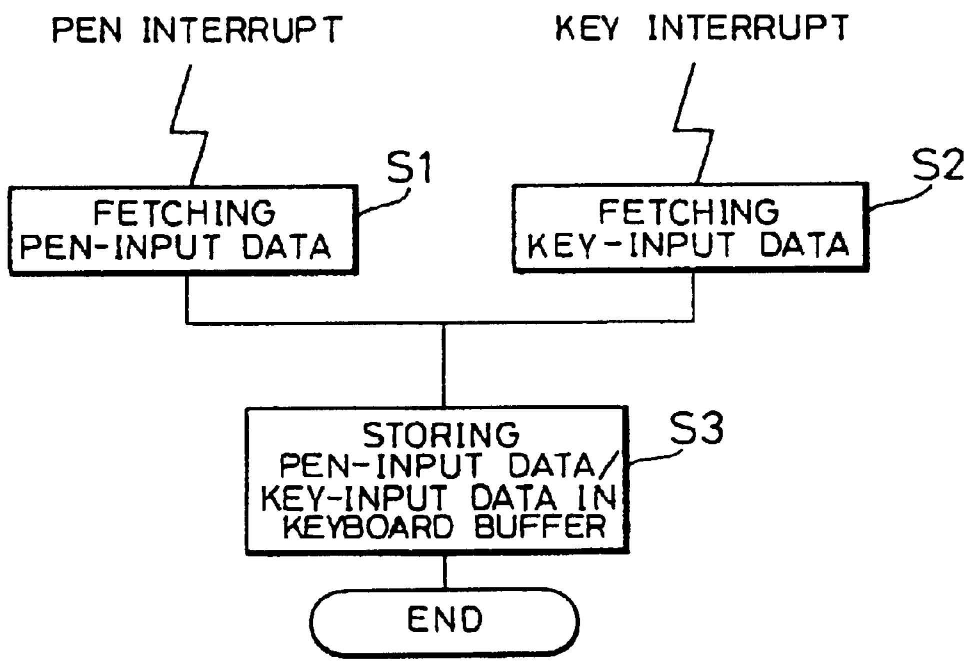
FIG. 2 is a flow chart showing the process of a operation to fetch pen-input data and key-input data performed in the information processing apparatus.

Firstly, as illustrated by the flow chart of FIG. 2, pen-input data or key-input data is fetched. In this process, pen-input data is fetched when a pen interruption occurs (step 1), while key-input data is fetched when a keyboard interrupt occurs (step 2). The pen-input data or the key-input data is stored in the keyboard buffer 21 (step 3).

Figure 3:
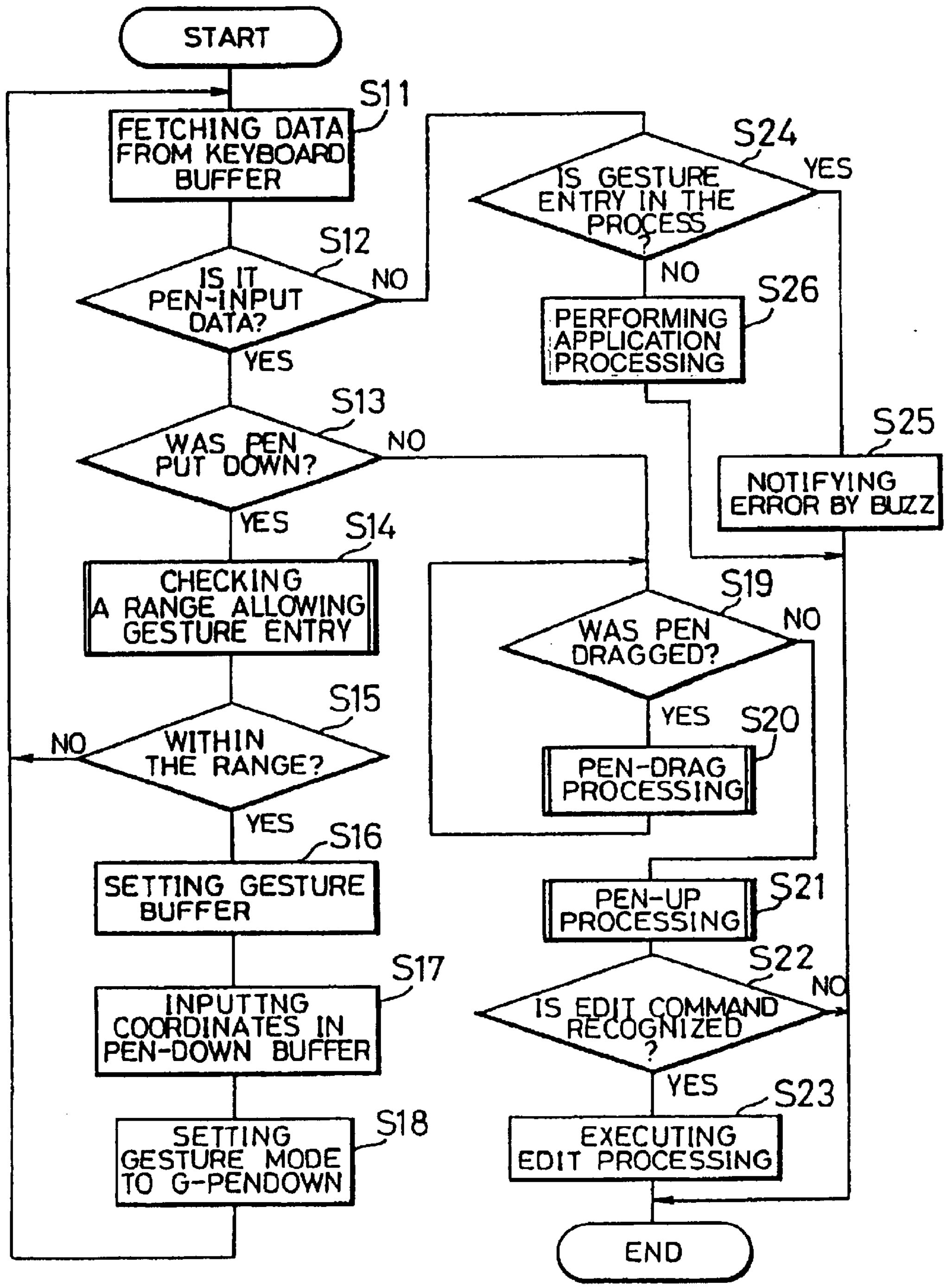
FIG. 3 is a flow chart showing the process of separately executing pointing entry and gesture entry in the information processing apparatus.

As illustrated by the flow chart of FIG. 3, in the successive process, data is fetched from the keyboard buffer 21 (step 11). Whether the data is pen-input data or not is judged (step 12). If the data is pen-input data, whether the pen-input data has been entered by putting the input pen 16 down or not is evaluated (step 13).

If the pen-input data has been entered by putting the input pen 16 down, a range of coordinates allowing gesture entry is examined (step 14). Then, whether the pen-down coordinates exist within the range or not is evaluated (step 15). If the pen-down coordinates exist within the range, the gesture buffer 22 is set (step 16), and the pen-down coordinates are stored in the pen-down buffer 27 (step 17). The gesture mode is set to G-PENDOWN, and the mode is stored in the mode buffer 23 (step 18). Then, the process returns to step 11. In the case when the pen-down coordinates do no exist within the range allowing the gesture entry in step 15, the process returns to step 11.

If step 13 judges that the pen-input data is not entered by putting down the input pen 16, whether the pen-input data is entered by dragging the input pen 16 is evaluated (step 19). If the pen-input data is entered by dragging the input pen 16, pen-drag processing is performed (step 20) and the process returns to step 19.

Meanwhile, if the pen-input data is not entered by dragging the input pen 16, the input pen 16 is lifted up (step 21). Then, whether the gesture (edit) command is recognized or not is judged (step 22). When the gesture command is recognized, editing is performed according to the gesture command (step 23). On the other hand, when the gesture command is not recognized, the process is complete.

When step 12 judges that the data in the keyboard buffer 21 is key-input data, whether the gesture entry is proceeding or not is judged (step 24). If the gesture entry is in the process, it is judged that a key on the keyboard 15 is struck during the process and a buzz is given to notify that an error occurs (step 25). If the gesture entry is not in the process, an application is performed using the keyboard 15 (step 26).

Figure 4:
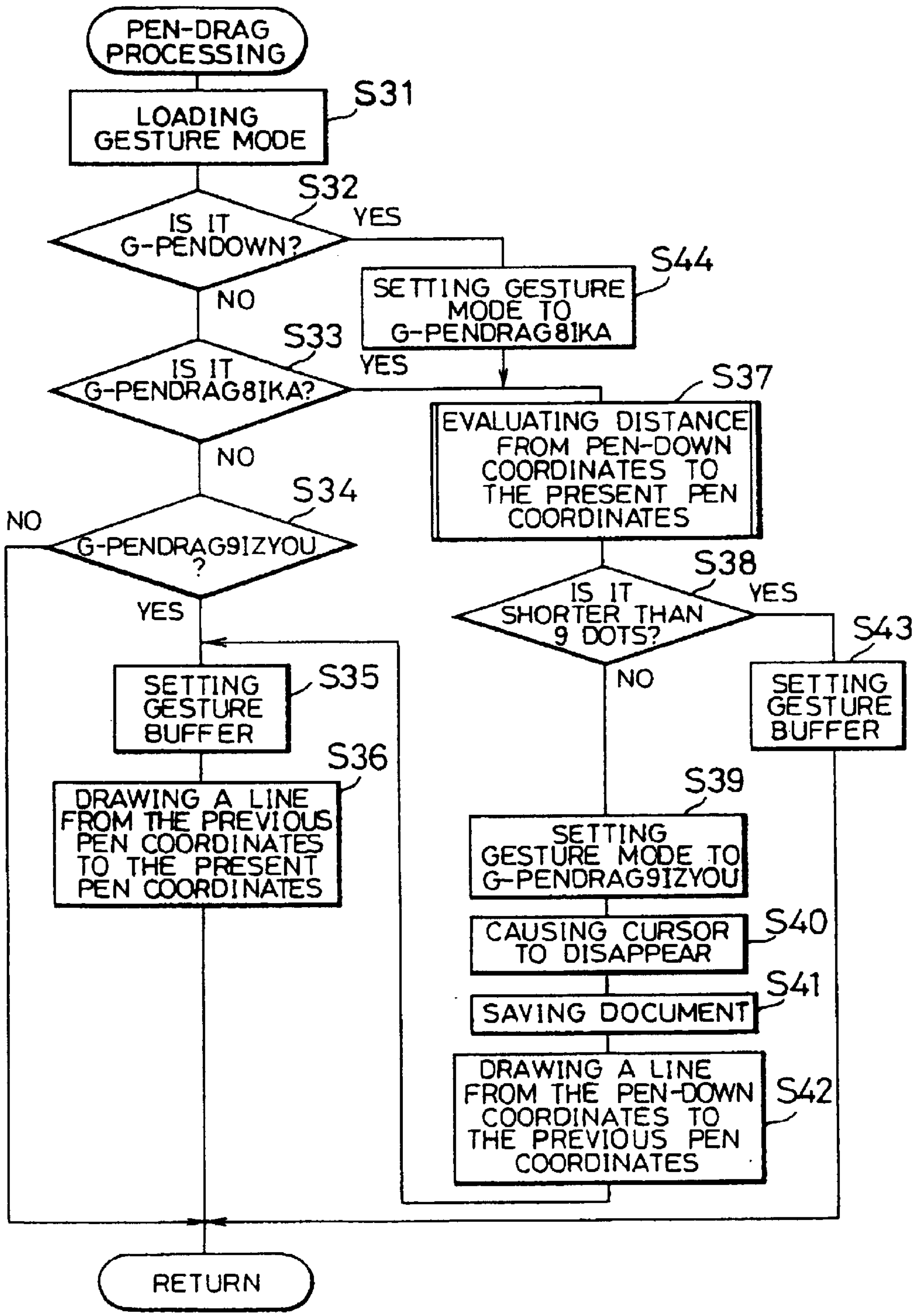
FIG. 4 is a flow chart showing the process of putting down the pen in the information processing apparatus.

The pen-drag processing in step 20 is performed through the process shown in FIG. 4. Firstly, a gesture mode is loaded (step 31), and whether the gesture mode is G-PENDOWN or not is determined (step 32). If the gesture mode is not G-PENDOWN, whether the gesture mode is G-PENDRAG8IKA or not is determined (step 33). If the gesture mode is not G-PENDRAG8IKA, whether the gesture mode is G-PENDRAG9IZYOU or not is determined (step 34). If the gesture mode is G-PENDRAG9IZYOU, the gesture buffer 22 is set (step 35).

In this case, the distance between the pen coordinates entered when the gesture mode was set last time and the pen-down coordinates is more than eight dots, the pen movement is displayed as a line on the screen 31. Therefore, a line is drawn from the pen coordinates to the current coordinates of the input pen 16 (step 36) and the pen-drag processing is complete. When the gesture mode is not G-PENDRAG9IZYOU in step 34, the last gesture mode is G-PENUP, and therefore the line is not drawn.

When the gesture mode in step 33 is G-PENDRAG8IKA, the distance between the pen-down coordinates and the current coordinates of the input pen 16 are calculated (step 37). Whether the distance is less than nine dots or not is evaluated (step 38). If the distance is more than eight dots, the gesture mode is set to G-PENDRAG9IZYOU (step 39), and the cursor is caused to disappear from the screen 31 (step 40). The information on the screen 31 is saved (step 41), and a line is drawn from the pen-down coordinates to the coordinates entered at the time the gesture mode was set last time (step 42). The process then moves to step 35.

When the distance between the pen-down coordinates and the current coordinates of the input pen 16 is less than nine dots, the gesture buffer 22 is set (step 43), and the pen-drag processing is complete. When the gesture mode in step 32 is G-PENDOWN, the gesture mode is set to G-PENDRAG8IKA (step 44) and the process moves to step 37.

Figure 5:
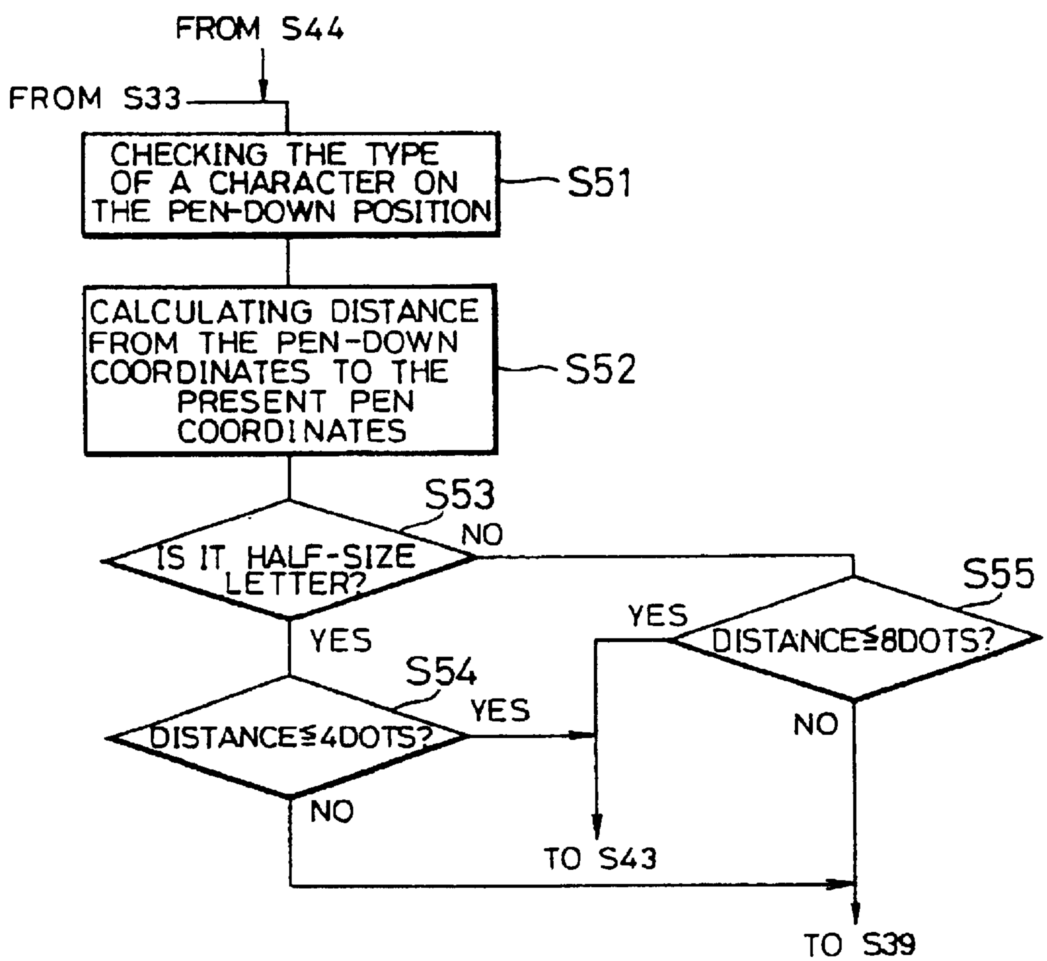
FIG. 5 is a flow chart showing the process of judging a distance of a pen movement depending on whether a symbol on which the pen is put down is a half-size symbol or not.

If pen-drag processing is performed on a document including a half-size letter, the operations of steps 37 and 38 are replaced with the operations shown in the flow chart of FIG. 5. With these operations, the type of the character at the pen-down position is evaluated (step 51), the distance between the pen-down coordinates and the current coordinates of the input pen 16 is calculated (step 52), and whether the character is of a half-size letter or not is judged (step 53).

If the character is of a half-size letter, whether the distance calculated in step 52 is less than five dots or not is judged. The process moves to step 43 when the distance is less than five dots, while the process moves to step 39 when the distance is more than four dots. On the other hand, if the character is not a half-size letter, whether the distance is less than nine dots or not is evaluated (step 55). If the distance is less than nine dots, the process moves to step 43. While if the distance is more than eight dots, the process moves to step 39.

Figure 1:
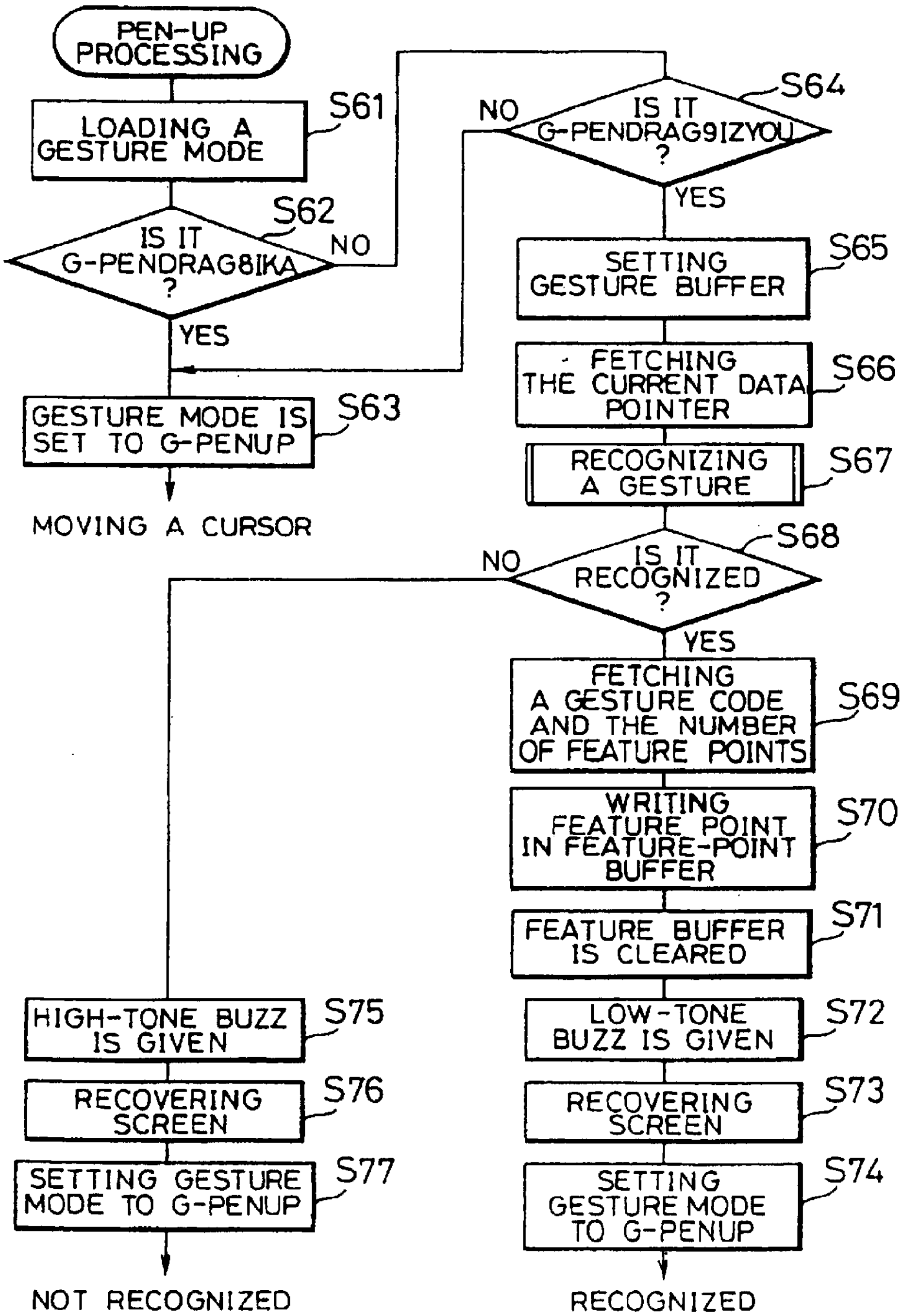
FIG. 1 is a flow chart showing the process of lifting up a pen in an information processing apparatus of a first embodiment of the present invention.

More specifically, the pen-up operation of step 21 is performed through the process shown in the flow chart of FIG. 1. Firstly, a gesture mode is loaded (step 61), and whether the gesture mode is G-PENDRAG8IKA or not is evaluated (step 62). If the gesture mode is G-PENDRAG8IKA, the gesture mode is set to G-PENUP (step 63) and a pointing operation including moving the cursor is performed.

If the gesture mode in step 62 is not G-PENDRAG8IKA, whether the gesture mode is G-PENDRAG9IZYOU or not is evaluated (step 64). When the gesture mode is not G-PENDRAG9IZYOU, the process moves to step 63. On the other hand, if the gesture mode is G-PENDRAG9IZYOU, the gesture buffer 22 is set (step 65) and the current data pointer is fetched in the gesture command judging section 36 (step 66).

Next, the gesture command judging section 36 compares the coordinates data and the gesture command to recognize the gesture (step 67). Then, whether the gesture is recognized or not is judged (step 68). If a gesture command is recognized, the code and feature point(s) of the gesture command are fetched in the code buffer 25 and the feature-point buffer 26, respectively (step 69). Then, the coordinates of the feature point(s) are written in the feature-point buffer 24 (step 70). Also, areas in which the coordinates of the feature point(s) are not stored is cleared (step 71).

A low-tone buzz is given if the gesture command is recognized (step 72). Then, the cursor is caused to appear and the screen 31 is recovered (step 73). Next, the gesture mode is set to G-PENUP (step 74). Meanwhile, if the gesture command is not recognized in step 68, a high-tone buzz is given to notify that no gesture command is recognized (step 75), the cursor is caused to appear and the screen 31 is recovered (step 76). Then, the gesture mode is set to G-PENUP (step 77).

As described above, in the information processing apparatus of this embodiment, the pointing operation including moving the cursor and the gesture entry are distinguished and processed in accordance with a distance of a pen movement. It is therefore not necessary to provide the input pen 16 with a switch for switching modes between the pointing operation and the gesture entry. Moreover, the above-mentioned processing is executable on a half-size letter.

In the information processing apparatus, in the pen-drag processing, if a pen movement is recognized as a gesture, the cursor is caused to disappear. And when the pen 16 is lifted up and a gesture command is recognized, the cursor is caused to appear again. Therefore, the line displayed on the screen 31 does not overlap the cursor, achieving a clear view.

Moreover, in the information processing apparatus, the line is displayed only when the input pen 16 is dragged by a distance more than a predetermined dots required to recognize a gesture command. Namely, the line which is not recognized as a gesture command is not displayed. Furthermore, since the line is displayed as the input pen 16 is moved, it is possible to check the line.

In addition, since the information processing apparatus uses the pen-down coordinates as one of the feature points of a gesture command, a character or a series of characters to be edited is easily specified. More specifically, when editing a character, the input pen 16 specifies the position of the character to be edited and the cursor is moved to the position. When specifying an editing location by a gesture, since the position of the cursor is specified by the pointing operation using the input pen 16, improved handling is achieved. Since there is no need to set a editing reference position with respect to each gesture command, a control program of editing is simplified.

Embodiment 2

The following description discusses a second embodiment of the present invention with reference to FIGS. 6, 15 to 30. The components having the same function as those in the above-mentioned embodiment are designated by the same code and their description is omitted.

As illustrated in FIG. 6, basically, an information processing apparatus of this embodiment has the same structure as that of the apparatus of the first embodiment.

Figure 15:
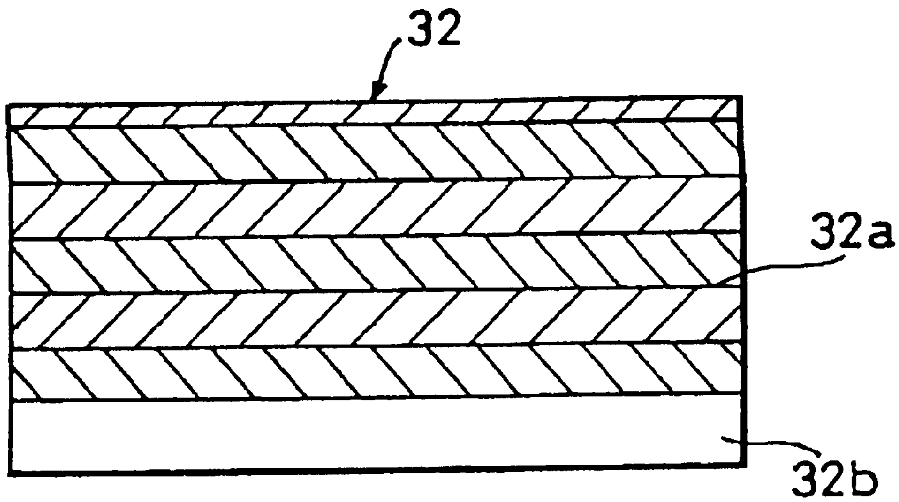
FIG. 15 is an explanatory view illustrating an effective area and an ineffective area of a tablet in the information processing apparatus in terms of gesture entry according to the second embodiment of the present invention.

As shown in FIG. 15, a tablet 32 of the information processing apparatus has an effective area 32*a* (indicated by slanting lines) in which gesture entry is available, and an ineffective area 32*b* having an icon which takes precedence over the gesture entry.

Figure 16:
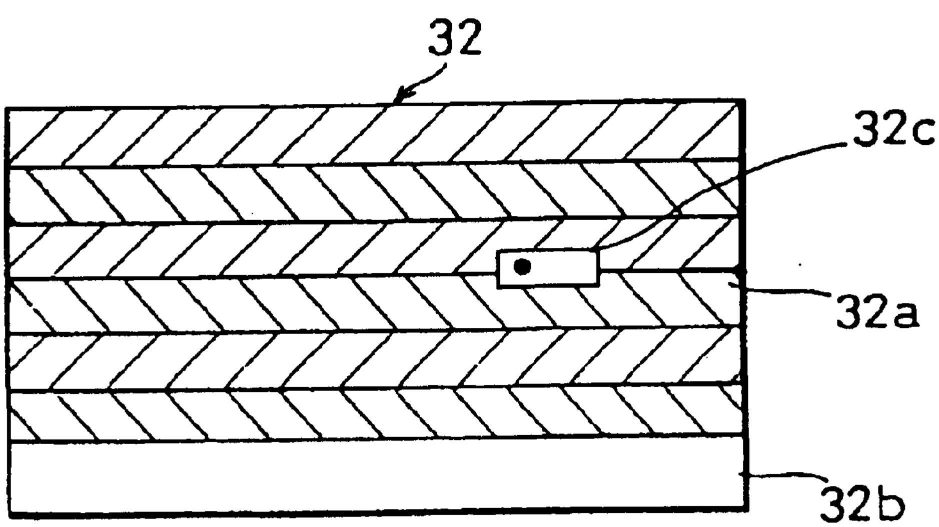
FIG. 16 is an explanatory view illustrating a pen-button area on the tablet.

Also, as illustrated in FIG. 16, the effective area 32*a* includes a pen button area 32*c* where a particular function is selected by a pointing operation of the input pen 16. The pen button area 32*c* takes precedence over the effective area 32*a* in terms of pen entry. More specifically, when the input pen 16 is put down in the pen button area 32*c*, pen-button processing is executed.

Figure 17:
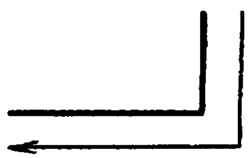
FIG. 17 is an explanatory view illustrating a combination of a reference stroke and a gesture command used in the information processing apparatus.
Figure 17:
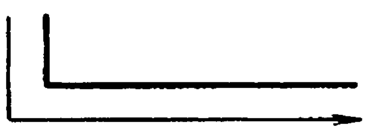
Figure 17:
Figure 17:
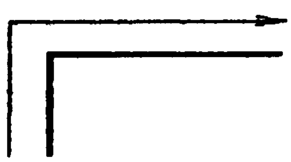
Figure 17:

For example, the information processing apparatus employs gesture commands shown in FIG. 17. More particularly, when ending a line, the input pen 16 is first moved downward to draw a vertical straight line and then moved to the left to draw a straight line perpendicular to the vertical line. When inputting a space, the input pen 16 is first moved downward to draw a vertical straight line and then moved to the right to draw a straight line perpendicular to the vertical line. To delete a character, a loop is drawn.

Figure 18:
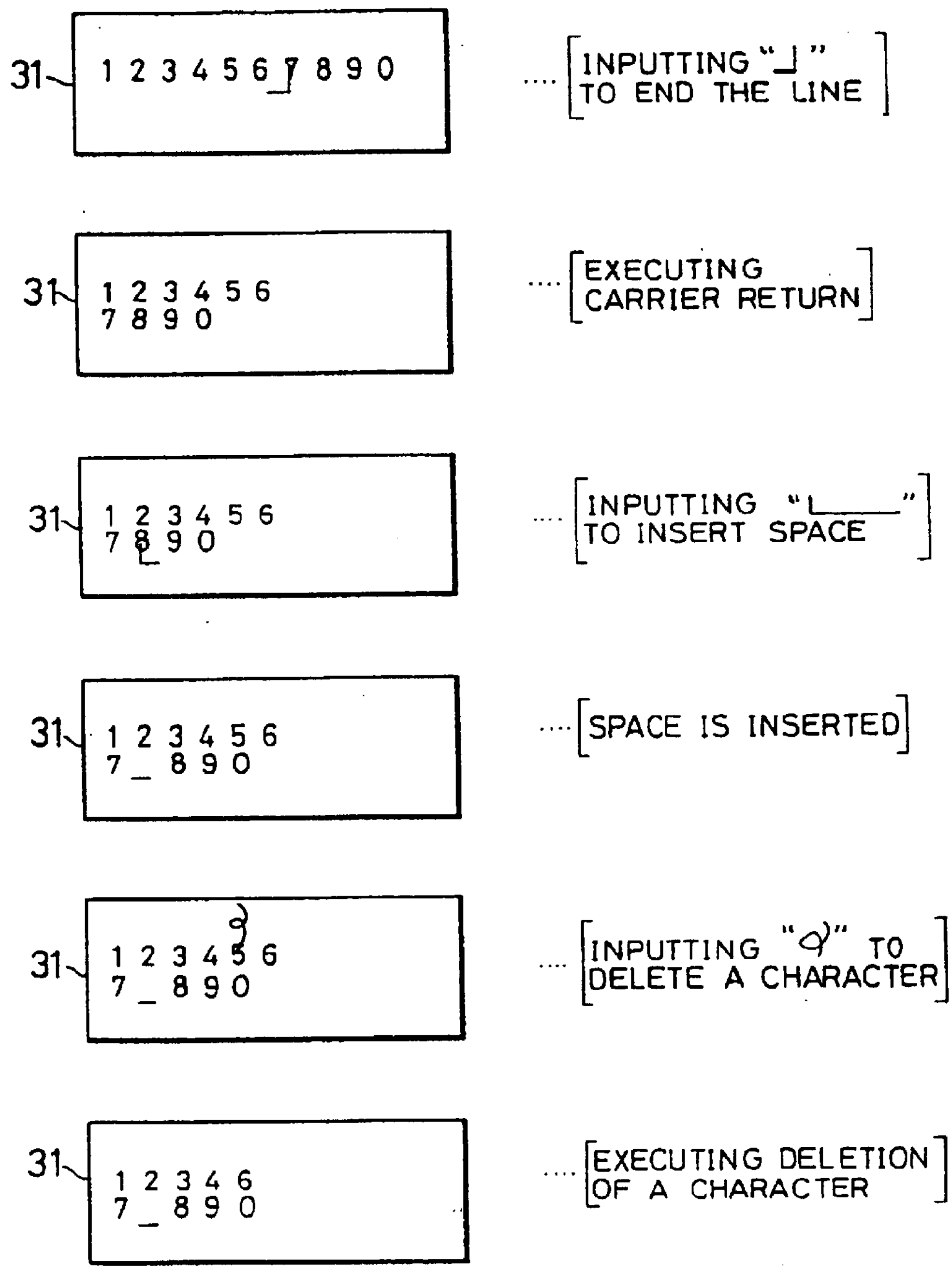
FIG. 18 is an explanatory view illustrating editing performed on the screen of the information processing apparatus by gesture entry.

These symbols are drawn on the screen 31 as shown in FIG. 18. When an edit symbol to end a line is input on the position of "7", a series of numeric characters after "7" is moved to the next line. When an edit symbol for space is input on the numeric character "8", a space for one character is inserted between "7" and "8". When an edit symbol to delete a character is input on the position of "5", the character "5" is erased.

Figure 19:
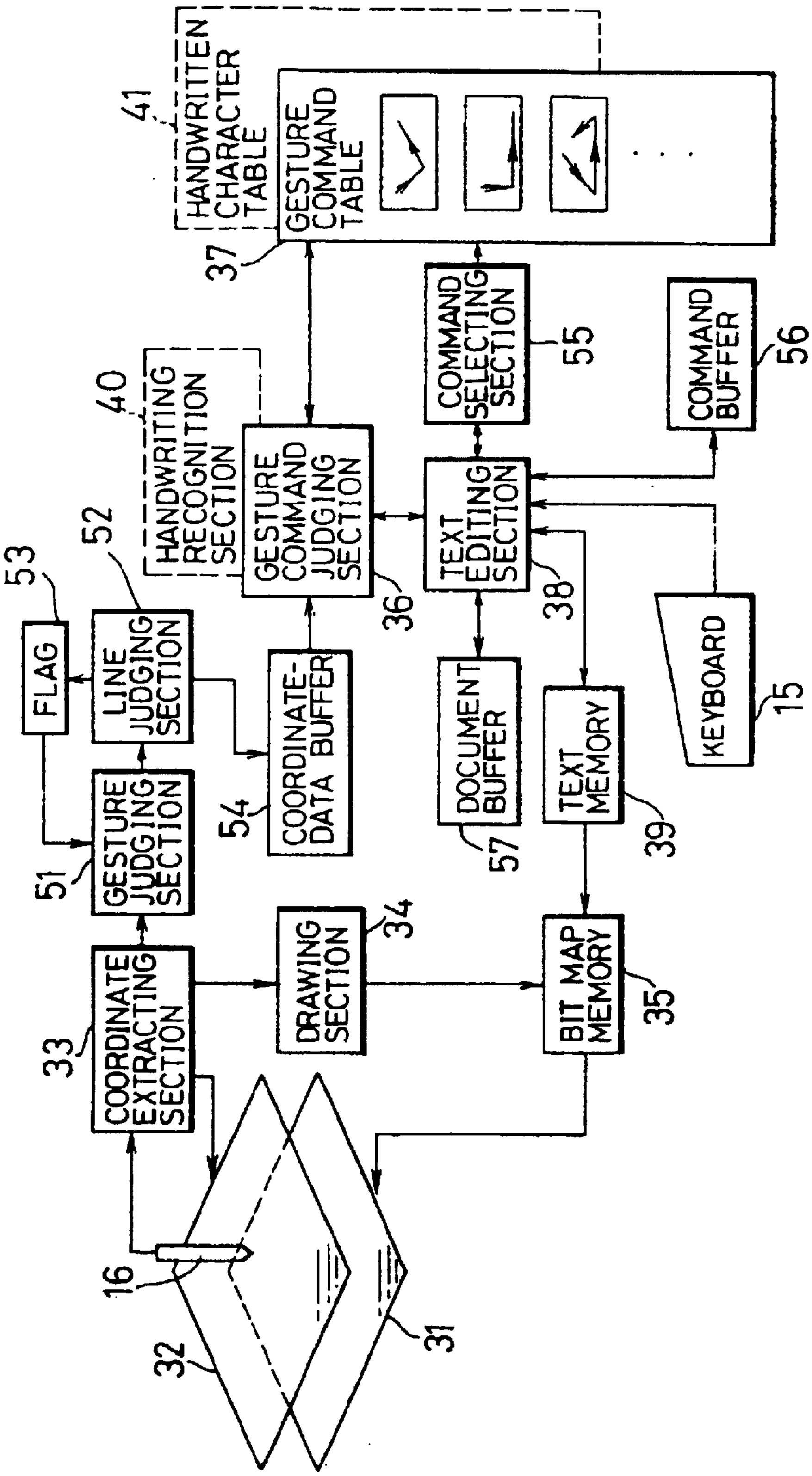
FIG. 19 is a block diagram illustrating a structure of a pen operation system to execute the gesture processing of FIG. 18.

As illustrated in FIG. 19, a pen operation system of the information processing apparatus includes a gesture judging section 51, a line judging section 52, a flag specifying section 53, a coordinate data buffer 54, a command selecting section 55, a command buffer 56 and a document buffer 57 in addition to the pen operation system of the information processing apparatus of the first embodiment.

The gesture judging section 51 judges whether the input pen 16 is put down in the effective area 32*a* or the ineffective area 32*b*. If the input pen 16 is put down in the effective area 32*a*, the gesture judging section 51 further judges whether the input pen 16 is put down in the pen-button area 32*c* or not. When an ON flag to be described later is set, the gesture judging section 51 does not make the above-mentioned judgements, treats the all the input coordinate data as effective data, and sends the data to the line judging section 52.

When the input pen 16 is put down in the ineffective area 32*b*, the gesture judging section 51 makes gesture entry unavailable, and allows other types of entry, for example, icon entry. While, when the input pen 16 is put down in the pen-button area 32*c*, the gesture judging section 51 makes gesture entry unavailable, and allows pen-button entry.

When the gesture judging section 51 judges the input pen is put down in the effective area 32*a* but not in the pen-button area 32*c*, the line judging section 52 sets the ON flag to the flag specifying section 53, allowing gesture processing. The line judging section 52 stores coordinate data of pen data in coordinate data buffer 54 assigned as a memory area in the RAM 2 as the ON flag is set. Moreover, the line judging section 52 resets the flag specifying section 53 when all the coordinate data stored in the coordinate data buffer 54 is output to the gesture command judging section 36.

The gesture judging section 51, the line judging section 52 and the flag specifying section 53 are included in the pen interface 9. Therefore, when the input pen 16 is put down in the effective area 32*a* but not in the pen-button area 32*c*, even if the input pen 16 is lifted up from the ineffective area 32*b* after drawing a line, the gesture processing is available. Namely, even when the input pen 16 is moved into the ineffective area 32*b* after being put down in the effective area 32*a*, the gesture entry mode does not switch to the icon entry mode. The pen interface 9 determines which input mode is to be allowed according to an area where the input pen 16 is put down. Namely, the pen interface 9 also functions as input judging means.

The command selecting section 55 determines whether the gesture command judging section 36 is accessible to each of the reference strokes in the gesture command table 37. The results are input by input pen such as the input pen 16 and the keyboard 15 via the text editing section 38. The command selecting section selects the status of each reference stroke from accessible and inaccessible states. The command selecting section 55 may also classify the reference strokes into groups, and determines whether each group of reference strokes is accessible or not. In addition, the command selecting section 55 functions as status selecting means, grouping means and mode selecting means.

The command buffer 56 stores a table (see FIG. 25) showing whether commands corresponding to the reference strokes are accessible or not, and freely retrieves the table, and sends it to the text editing section 38 so as to be displayed by the display device 12. Moreover, when the reference strokes are classified into groups, the command buffer 56 stores a table (see FIG. 28) showing the classification of the groups so as to select a gesture status mode from a mode in which, for example, all the gesture command are ineffective, a mode in which only gesture command specified are effective, and a mode in which all the gesture commands are effective. Thus, the command buffer 56 functions as filing means.

The document buffer 57 as storing means temporarily stores the a document in the text memory 39 displayed on the display device 12 when the line drawn with the input pen 16 is judged as a gesture. At this time, the document in the text memory 39 is read out by the text editing section 38 and is transferred to the document buffer 57. When the next document is stored in the document buffer 57, the last stored document is cleared.

The following description discusses how gesture processing operations are executed in the information processing apparatus. Firstly, a process of determining whether the gesture processing is executable using pen-button coordinates is discussed.

Figure 20:
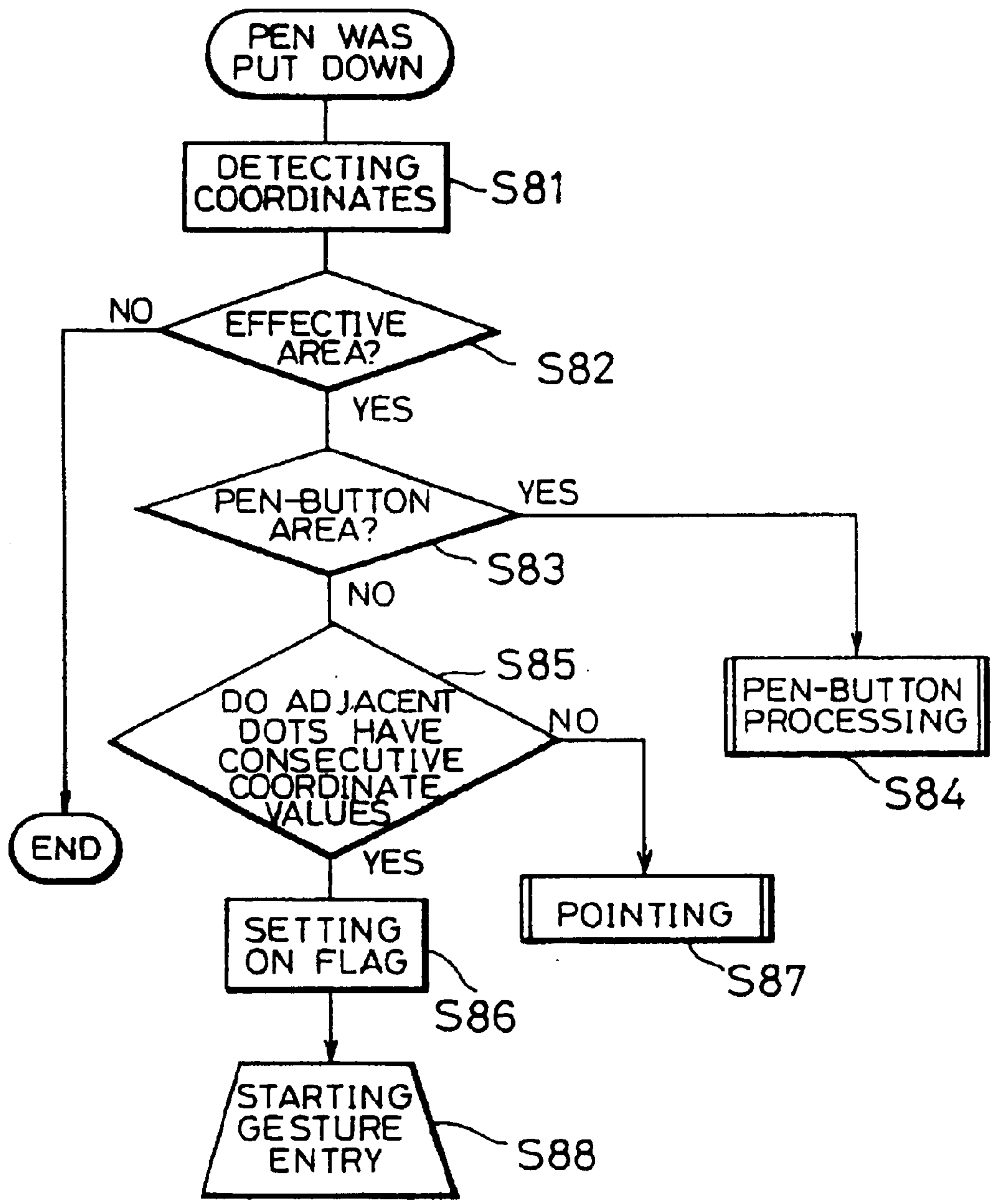
FIG. 20 is a flow chart showing the process of putting down a pen in the information processing apparatus.

As illustrated in the flow chart of FIG. 20, the input pen 16 is put down on the tablet 32 and the pen-input data is sent to the coordinate extracting section 33 to detect pen-down coordinates (step 81). Next, whether the input pen 16 is put down in the effective area 32*a* or not is judged (step 82). If the input pen 16 is put down in the ineffective area 32*b*, gesture entry is unavailable and the process is complete.

On the other hand, when the input pen 16 is put down in the effective area 32*a*, whether the input pen 16 is put down in the pen-button area 32*c* or not is judged (step 83). If the input pen 16 is put down in the pen-button area 32*c*, the pen-button processing is performed (step 84).

While, when the input pen 16 is put down out of the pen-button area 32*c*, the pen-down coordinates are stored. Then, whether the input pen 16 is to be moved over more than eight dots of consecutive coordinate values is judged (step 85). At this time, if adjacent dots have consecutive values in at least one coordinate direction, i.e., the x-coordinate or y-coordinate direction are judged.

If the input pen 16 is moved over more than eight dots of consecutive values, gesture processing is executable and the ON flag is set (step 86). When the ON flag is set, even if the input pen 16 is moved into the ineffective area 32*b*, a pointing operation of the input pen 16 becomes ineffective in the ineffective area 32*b*. When the ineffective area 32*b* includes icons, an inputting operation using the icons becomes unavailable. Meanwhile, when the input pen 16 is moved over less than nine dots, if the values the coordinates data are not consecutive, pointing operation becomes available (step 87).

It is also possible to set the ON flag to allow the gesture entry prior to the judgement of step 86 by reversing the order of step 85 and step 86. In this case, if the coordinate values of the dots are not consecutive, the ON flag is reset and the pointing operation becomes available.

Figure 21:
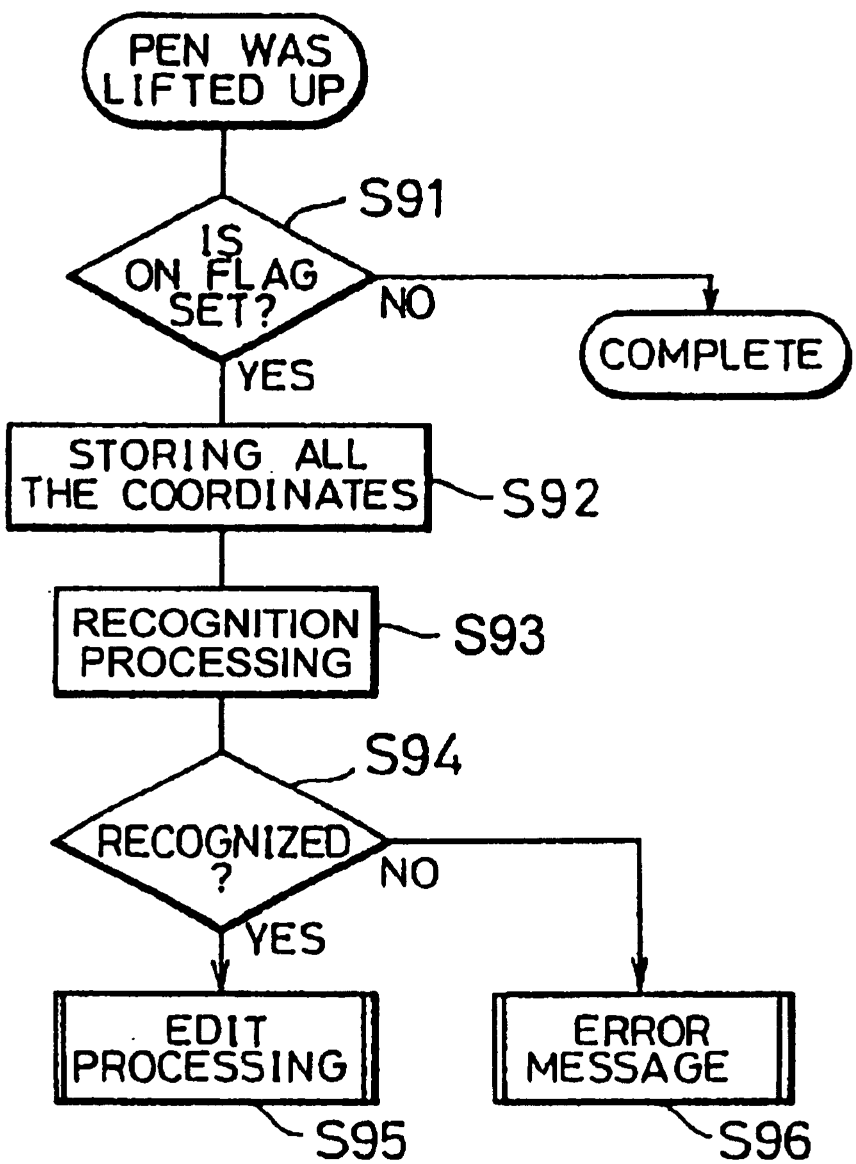
FIG. 21 is a flow chart showing the process of lifting up the pen in the information processing apparatus.

Then, when the input pen 16 is moved on the tablet 32 to input an image and is lifted up, the process shown by the flow chart of FIG. 21 is performed.

Firstly, whether the ON flag is set or not is judged (step 91). If the ON flag is not set, the input operation of the input pen 16 is determined irrelevant to gesture entry, making the gesture entry ineffective.

If the ON flag is set in step 91, the gesture command judging section 36 first normalizes all the coordinate data of the input pen 16 from the pen-down coordinate to the pen-up coordinate, and stores them in the coordinate data buffer 54 for recognition (step 92). The gesture command judging section 36 executes recognition processing of coordinate data (step 93). The line drawn according to the coordinate data is compared with the data of the reference strokes of gesture commands stored in the gesture command table 37.

When the line is recognized (step 94), the corresponding editing operation is executed (step 95) and the gesture-driven editing is complete. When the line is not recognized, an error message is given (step 96).

In the information processing apparatus, even when the input pen 16 is lifted up from an area other than the effective area 32*a*, the gesture processing is executable if the ON flag is set. Additionally, in the case where the input pen 16 is put down in the effective area 32*a* but out of the pen-button area 32*c*, even if the coordinates successive to the pen-down coordinates are located outside the effective area 32*a* but within the pen-button area 32*c*, the coordinates are judged effective and gesture-command recognition processing is performed.

Figure 22:
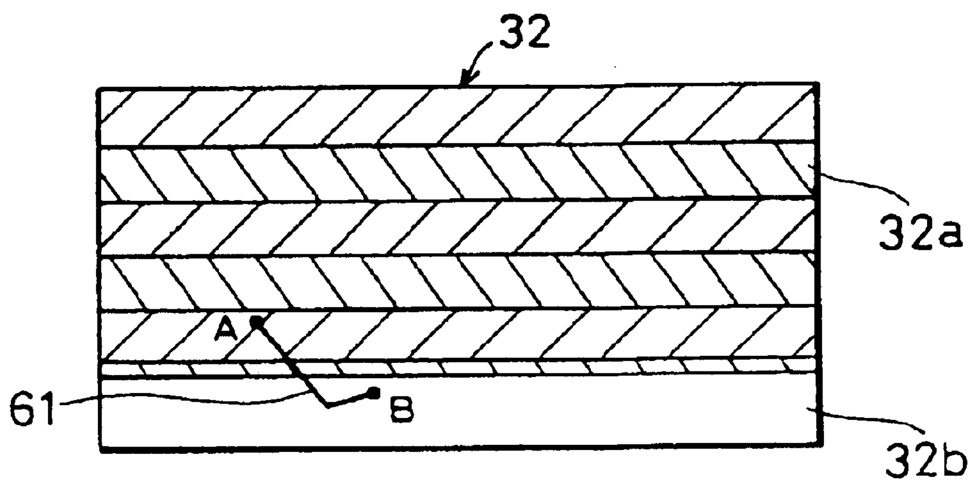
FIG. 22 is an explanatory view illustrating a trace of the pen on the tablet in the information processing apparatus.

With this arrangement, as illustrated in FIG. 22 for example, when the input pen 16 is put down on a point A in the effective area 32*a*, a line 61 drawn with the input pen 16 is effective even if the input pen 16 is lifted up from a point B in the ineffective area 32*b*. Furthermore, even if the input pen 16 is moved into the ineffective area 32*b* after being put down in the effective area 32*a*, the line 61 drawn with the input pen 16 is effective.

Figure 23:
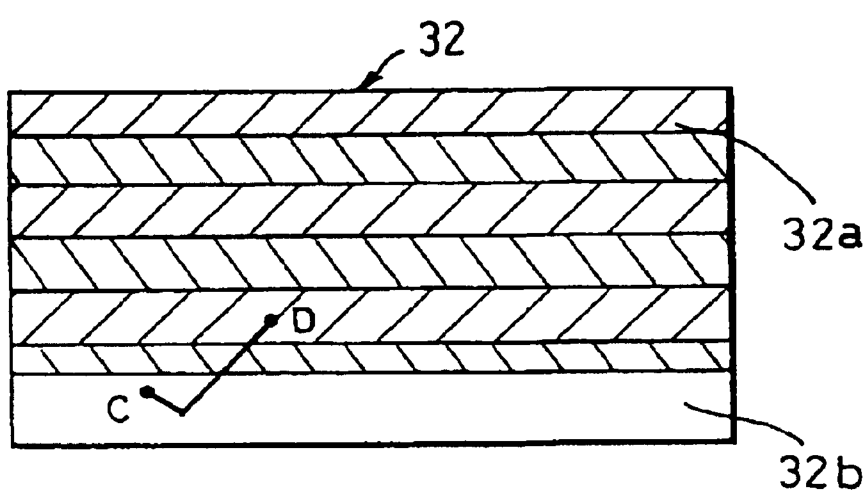
FIG. 23 is an explanatory view illustrating another example of a trace of the pen on the tablet in the information processing apparatus.

However, as illustrated in FIG. 23 for example, when the input pen 16 is put down on a point C in the ineffective area 32*b*, the gesture entry becomes ineffective. In this case, for example, the icons provided in the ineffective area 32*b* become available.

On the other hand, when the input pen 16 is put down in the effective area 32*a*, the gesture entry is available. In this case, even when the input pen 16 is moved into the ineffective area 32*b* or the pen-button area 32*c*, the line 61 drawn with the input pen 16 is effective, enabling the gesture entry.

This arrangement enables part of the gesture processing, such as reading out the gesture command table 27, to be performed at the time the input pen 16 is put down in the effective area 32*a* and a gesture entry is judged effective, thereby improving the efficiency of gesture processing. Moreover, since the user can draw a line without concerning the effective area 32*a*, ineffective area 32*b* and pen button area 32*c*, a gesture is input more easily.

Figure 24:
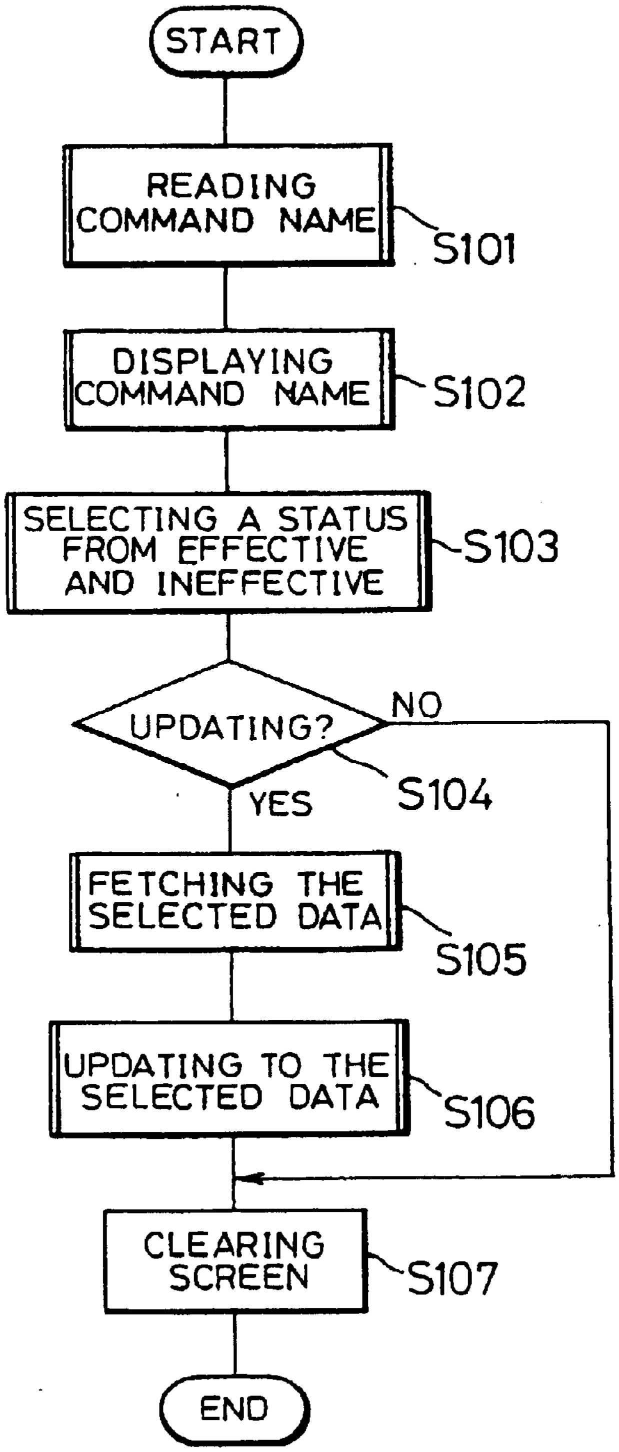
FIG. 24 is a flow chart showing the process of selecting the status of a gesture command from effective and ineffective in the information processing apparatus.

In the gesture processing, a command is selected through the process shown in the flow chart of FIG. 24.

Figures 25, 26:
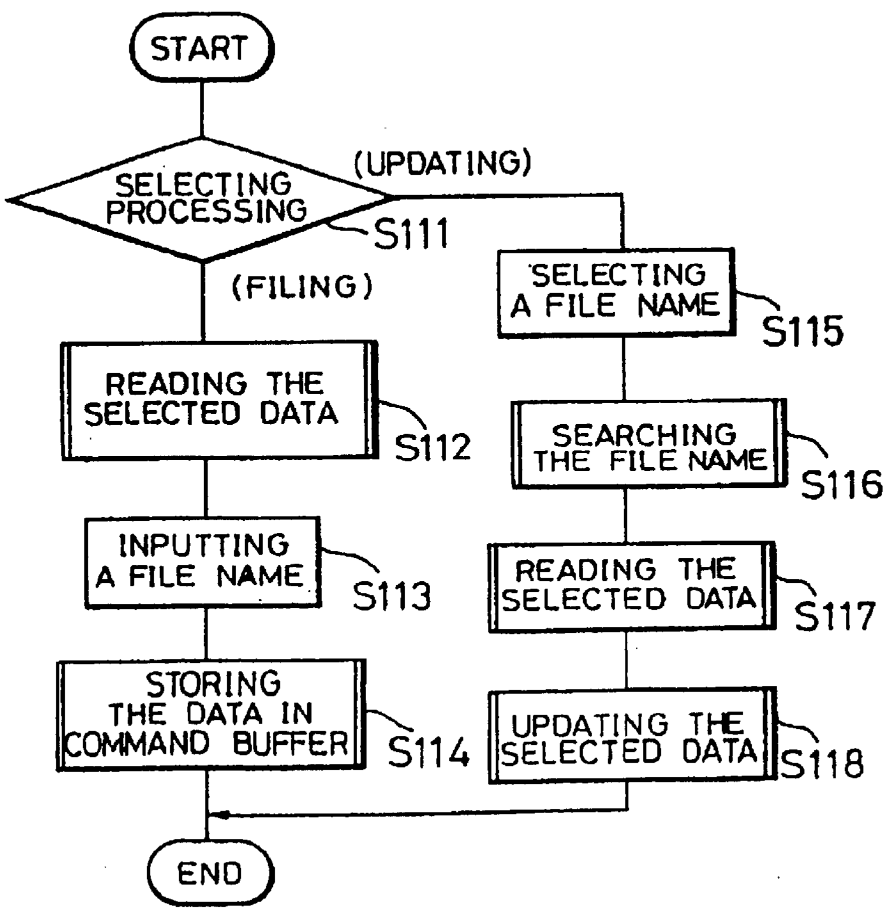
FIG. 25 is an explanatory view illustrating a screen showing information for use in selecting the status of a gesture command during the selecting operation of FIG. 24.
FIG. 26 is a flow chart showing the process of filing and updating the data of a gesture command.

When an instruction to perform command selecting processing is given through the input device such as the keyboard 15, all the recognizable commands are read out (step 101), and the commands and their status (whether effective or not) are displayed by the display device 12 as shown in FIG. 25 (step 102). Then, the status of each of these commands, i.e., effective or ineffective is selected by using for example solid and open circles through the keyboard 15 (step 103).

Next, if the status of the gesture command has been changed or not is judged (step 104). When changing the status of the commands, status data is fetched by depressing the enter key (step 105) and the status is updated (step 106).

Then, the display device 12 is cleared (step 107) and the processing is complete. On the other hand, when the status is not updated, the escape key on the keyboard 15 is depressed and processing is moved to step 107.

In the command selection, a filing/updating operation is performed through the process shown in the flow chart of FIG. 26. Firstly, the filing/updating operation is started by the instruction entered through the input device such as the input pen 16 and the keyboard 15. Then, an operation to be executed is selected between the filing operation and the updating operation (step 111). If it is the filing operation, all the current status data is displayed by the display device 12 (step 112). When the data is checked by the user, file names are input using the keyboard 15 (step 113). Then, the file names and their status data are stored in the command buffer 56 (step 114) and the filing operation is complete.

If the updating operation is selected in step 111, a file name is specified (step 115) and the file name in the command buffer 56 is searched (step 116). Status data corresponding to the specified command is displayed by the display device 12 (step 117), and the status data of the selected file is updated (step 118) to complete the updating operation.

In the information processing apparatus, since the status of each of the gesture commands is individually set to effective or ineffective, it is possible to make only a gesture command required by the user effective. This arrangement prevents unwanted gesture commands from being mistakenly recognized. Moreover, the number of gesture commands the user needs to remember is reduced. In other words, the user does not have to remember unnecessary gesture commands. Furthermore, as the rate of false recognition is decreased, edit processing required by the user is accomplished with accuracy.

With this structure, when a plurality of users use the same information processing apparatus, each user can select the status of gesture commands (whether the gesture commands are effective or ineffective) and store the results in its own file. This structure allows each of the users to always use a desired gesture command freely, enabling edit processing to be easily performed in accordance with each user's editing requests.

Furthermore, with the information processing apparatus, even when every user uses different gesture commands to perform a particular function, the rate of performing erroneous editing operations due to unnecessary commands is decreased. Thus, the efficiency of creating a document is improved.

Figures 27, 28:
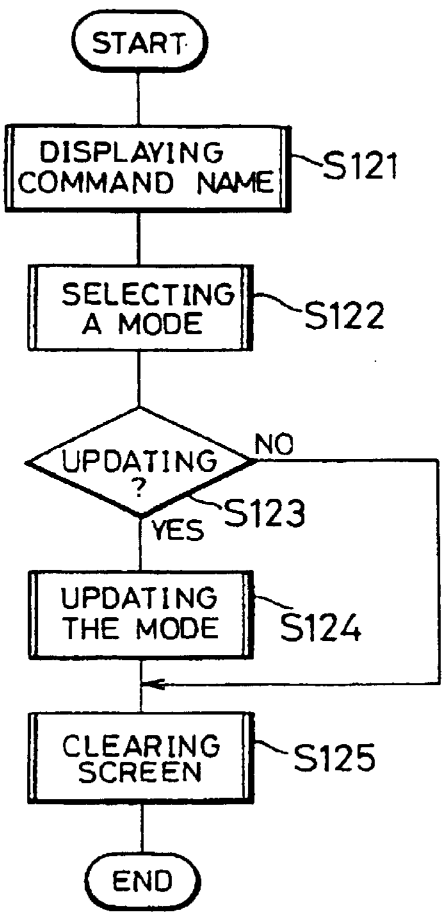
FIG. 27 is a flow chart illustrating the process of selecting a mode.
FIG. 28 is an explanatory view illustrating the screen showing data for use in selecting the status of a gesture.

Additionally, when selecting a mode depending on the effective or ineffective status in the command selecting processing, the operations shown in the flow chart of FIG. 27 are performed. There are three modes, an effective mode, a partly effective mode and an ineffective mode. In the effective mode, all the gesture commands are effective regardless of their status. In the partly effective mode, only gesture commands classified into the effective group are effective. In the ineffective mode, all the gesture commands are ineffective regardless of their status.

If an interrupt occurs during the gesture processing due to an input to select a mode given through the keyboard 15, the input pen 16 or other input device, a gesture-mode selecting menu is displayed on the display device 12 as shown in FIG. 28 (step 121). Next, one mode is selected from the three modes using solid and open circles displayed on the screen 31 using the keyboard 15 (step 122). Then, whether to update the mode to the newly selected mode or not is determined (step 123).

When updating to the selected gesture mode, the enter key on the keyboard 15 is depressed to fetch the data of the selected mode (step 124). The menu displayed on the display device 12 is cleared (step 125) to complete the gesture-mode selecting processing. When the mode is not needed to be updated, the escape key on the keyboard 15 is depressed and the process moves to step 125.

By grouping the ineffective group of the gesture commands, false recognition of gesture commands is prevented. For example, a gesture command for erasure is made unavailable while making other gesture commands available by selecting the partly effective mode. In this case, when the gesture command for erasure is mistakenly input, the gesture command is not accepted, preventing a character or a series of characters from being mistakenly erased.

This structure eliminates the need to recreate the text which has been erased by the mistakenly input gesture command. Therefore, even the user who is not accustomed to using gesture entry can easily use the apparatus.

Figure 29:
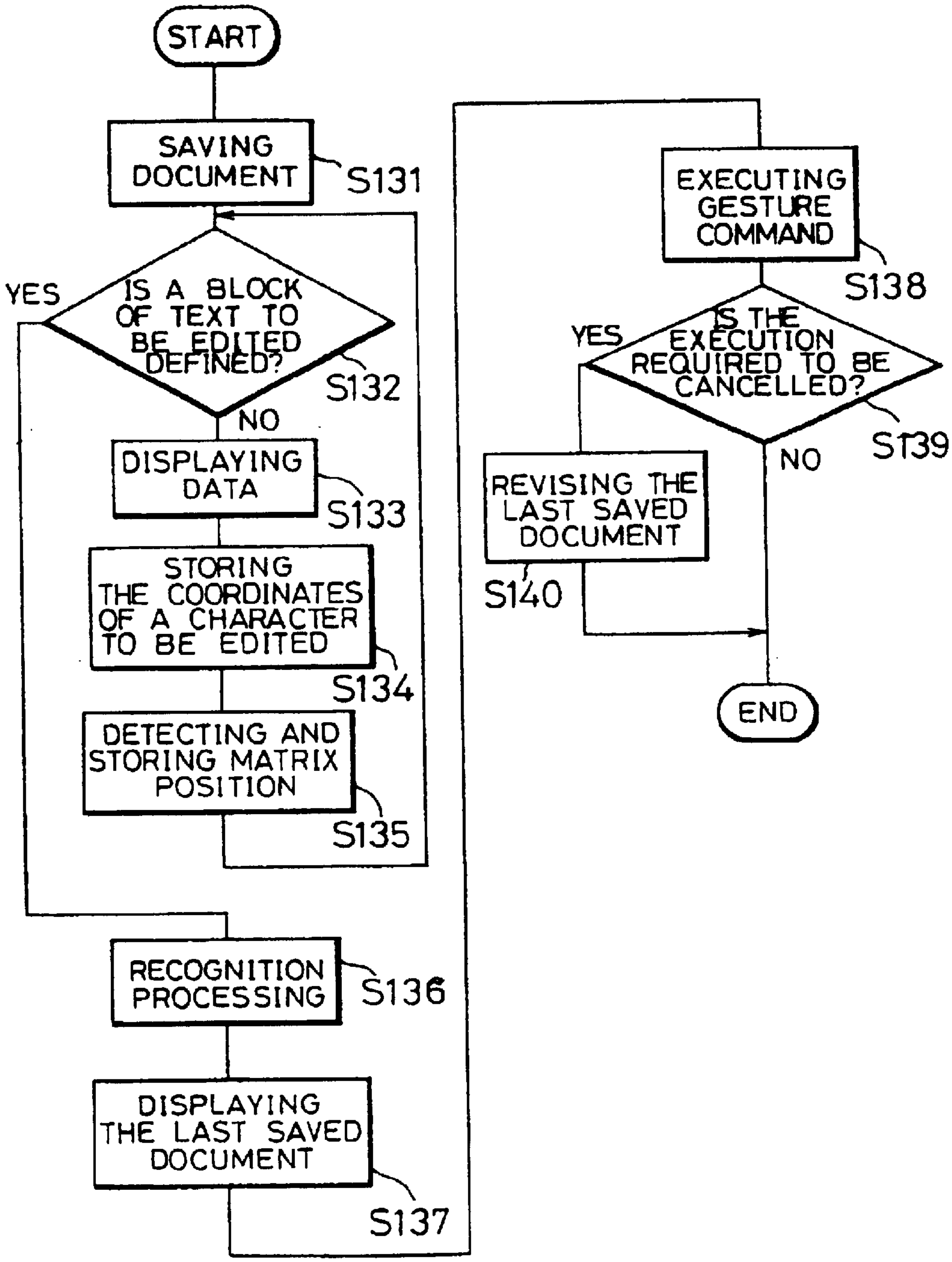
FIG. 29 is a flow chart showing the process of temporarily saving a document displayed in the information processing apparatus.

In addition, a document displayed on the displayed device 12 during the gesture processing is stored through the process shown by the flow chart of FIG. 29.

Figure 30:
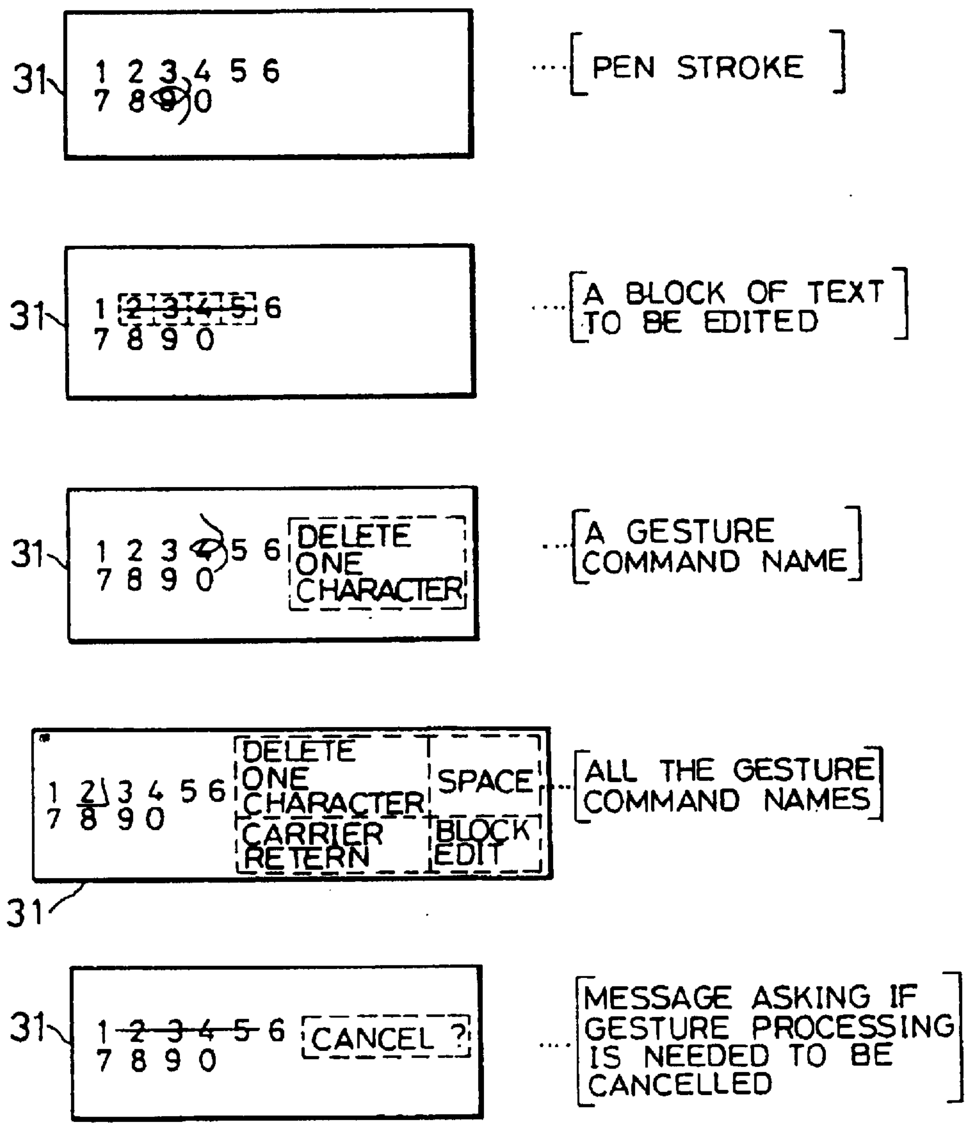
FIG. 30 is an explanatory view illustrating data shown together with the document saved in FIG. 29.

When a line drawn with the input pen 16 is judged as a gesture, a displayed document is saved and temporarily stored in the document buffer 57 (step 131). Then, whether a block of text to be edited is specified or not is judged (step 132). If the block is not specified, various data is displayed on the screen 31 of the display device 12 (step 133). For example, as illustrated in FIG. 30, the trace of the input pen 16, a block of text to be edited by the gesture command, a gesture command, a plurality of gesture commands, and a message asking if the gesture command is required to be cancelled are displayed.

A character to be edited by the gesture command is pointed by the input pen 16 and its coordinates are stored (step 134). The position of the character on the screen 31 is detected and stored (step 135). The operations of steps 132 to 134 are repeatedly performed until a block of text to be edited is specified.

When a block of text to be edited is specified in step 132, the gesture recognition operation of the input gesture command is performed by the gesture command judging section 36 (step 136). The document saved in step 131 is displayed again on the display device 12 (step 137), and the characters in the document are edited on the screen 31 according to the recognized gesture command (step 138).

Then, whether the execution of the gesture command is to be cancelled or not is judged (step 139). If the execution of the gesture command is not required to be cancelled, the edit processing is complete. On the other hand, if the execution of the gesture command is required to be cancelled, the document saved in step 131 is displayed again on the screen 31 (step 140).

In the information processing apparatus, since the document displayed on the display device 12 is saved in the document buffer 57 before performing gesture processing, the saved document is soon displayed again when the execution of a gesture command is cancelled.

Therefore, even when various data shown in FIG. 30 is displayed, redisplaying a saved document, executing a gesture command, cancelling an editing operation are promptly performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of using an information processing apparatus having a screen, an input pen, and a data processor, comprising:

storing a plurality of reference strokes;

detecting coordinates of a position on the screen pointed by the input pen;

specifying one or more edit instructions corresponding to respective ones of the reference strokes as enabled or one or more edit instructions corresponding to respective ones of the reference strokes as disabled;

storing in memory the specified edit instructions along with an indication selected by a user of whether a specified edit instruction is enabled or disabled including at least one edit instruction with an enabled indicator, at least one edit instruction with a disabled indicator, or at least one edit instruction with a partially effective indicator;

comparing a stroke formed by detected coordinates of successive pen pointing positions on the screen with certain ones of the reference strokes;

recognizing an edit instruction which is a closest match to the enabled stroke;

outputting the recognized edit instruction when the recognized edit instruction is specified in the memory as being enabled; and editing information displayed on the screen according to the output edit instruction.

2. The method according to claim 1, wherein the specifying step includes specifying a plurality of edit instructions as enabled or disabled in accordance with the indicators.

* * * * *